US012061425B2

(12) United States Patent
Kamimura et al.

(10) Patent No.: US 12,061,425 B2
(45) Date of Patent: Aug. 13, 2024

(54) PROCESS CARTRIDGE INCLUDING FRAME HAVING PHOTOSENSITIVE DRUM, DRUM COUPLING AND FLANGED FIXED TO PHOTOSENSITIVE DRUM

(71) Applicant: Brother Kogyo Kabushiki Kaisha, Nagoya (JP)

(72) Inventors: Naoya Kamimura, Ichinomiya (JP); Atsuhisa Nakashima, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/161,576

(22) Filed: Jan. 30, 2023

(65) Prior Publication Data

US 2023/0168603 A1 Jun. 1, 2023

Related U.S. Application Data

(63) Continuation of application No. 17/388,904, filed on Jul. 29, 2021, now Pat. No. 11,586,123, which is a (Continued)

(30) Foreign Application Priority Data

Dec. 28, 2007 (JP) ................................ 2007-340760

(51) Int. Cl.
*G03G 21/16* (2006.01)
*G03G 15/00* (2006.01)
(Continued)

(52) U.S. Cl.
CPC ....... *G03G 15/081* (2013.01); *G03G 15/0808* (2013.01); *G03G 15/0822* (2013.01);
(Continued)

(58) Field of Classification Search
CPC ............ G03G 15/0808; G03G 15/081; G03G 15/0822; G03G 15/757; G03G 21/1647; G03G 21/1814; G03G 21/1864
See application file for complete search history.

(56) References Cited

U.S. PATENT DOCUMENTS 5,471,286 A 11/1995 Tanaka
5,903,803 A 5/1999 Kawai et al.
(Continued)

FOREIGN PATENT DOCUMENTS

JP H02-100083 A 4/1990
JP H11-022745 A 1/1999
(Continued)

OTHER PUBLICATIONS

JP Office Action dated Nov. 22, 2011, JP Appln. 2007-340760, English translation.
(Continued)

*Primary Examiner* — Hoang X Ngo
(74) *Attorney, Agent, or Firm* — Banner & Witcoff, Ltd.

(57) ABSTRACT

The image forming apparatus includes a drum cartridge having a photosensitive drum and a drum drive input member; a developing cartridge configured to be movably mounted to the drum cartridge, the developing cartridge comprising a developing roller disposed so as to face the photosensitive drum and a developing drive input member; a drum drive transmission member configured to engage with the drum drive input member and configured to transmit drum driving force to the drum drive input member while permitting a positional gap of the drum drive input member within a predetermined range; and a developing drive transmission member configured to engage with the developing drive input member and configured to transmit developing driving force to the developing drive input
(Continued)

member while permitting a positional gap of the developing drive input member within a predetermined range.

10 Claims, 31 Drawing Sheets

Related U.S. Application Data continuation of application No. 17/236,637, filed on Apr. 21, 2021, now Pat. No. 11,385,565, which is a continuation of application No. 16/935,978, filed on Jul. 22, 2020, now Pat. No. 11,016,410, which is a continuation of application No. 16/864,215, filed on May 1, 2020, now Pat. No. 10,928,748, which is a continuation of application No. 16/573,249, filed on Sep. 17, 2019, now Pat. No. 10,678,162, which is a continuation of application No. 16/161,186, filed on Oct. 16, 2018, now Pat. No. 10,451,995, which is a continuation of application No. 15/705,344, filed on Sep. 15, 2017, now Pat. No. 10,139,749, which is a continuation of application No. 15/280,707, filed on Sep. 29, 2016, now Pat. No. 9,791,804, which is a continuation of application No. 14/927,602, filed on Oct. 30, 2015, now Pat. No. 9,471,003, which is a continuation of application No. 14/556,885, filed on Dec. 1, 2014, now Pat. No. 9,182,732, which is a continuation of application No. 13/946,588, filed on Jul. 19, 2013, now Pat. No. 8,903,280, which is a continuation of application No. 13/244,367, filed on Sep. 24, 2011, now Pat. No. 8,498,554, which is a continuation of application No. 12/340,867, filed on Dec. 22, 2008, now Pat. No. 8,068,767.

(51) Int. Cl.
*G03G 15/08* (2006.01)
*G03G 21/18* (2006.01)

(52) U.S. Cl.
CPC ....... *G03G 15/757* (2013.01); *G03G 21/1647* (2013.01); *G03G 21/1814* (2013.01); *G03G 21/1864* (2013.01)

(56) References Cited

U.S. PATENT DOCUMENTS

| | | | | |
|---|---|---|---|---|
| 6,035,159 | A * | 3/2000 | Azuma | G03G 21/186 399/167 |
| 6,285,847 | B1 | 9/2001 | Tanizaki et al. | |
| 6,400,914 | B1 * | 6/2002 | Noda | G03G 15/757 399/167 |
| 7,242,890 | B2 | 7/2007 | Yokota | |
| 7,272,340 | B2 | 9/2007 | Song | |
| 7,526,228 | B2 | 4/2009 | Shiraki | |
| 7,577,382 | B2 | 8/2009 | Sato et al. | |
| 7,817,938 | B2 | 10/2010 | Igarashi | |
| 7,899,364 | B2 | 3/2011 | Chadani et al. | |
| 2005/0201772 | A1 * | 9/2005 | Ishii | G03G 21/1814 399/90 |
| 2006/0034637 | A1 | 2/2006 | Kim et al. | |
| 2006/0245786 | A1 * | 11/2006 | Suzuki | G03G 21/1821 399/111 |
| 2007/0048016 | A1 | 3/2007 | Moon | |
| 2007/0147881 | A1 * | 6/2007 | Okabe | G03G 21/1864 399/110 |
| 2007/0166070 | A1 | 7/2007 | Sato | |
| 2007/0223962 | A1 | 9/2007 | Shiraki | |
| 2007/0264048 | A1 | 11/2007 | Kuroda | |
| 2011/0002709 | A1 | 1/2011 | Sato | |
| 2015/0055974 | A1 | 2/2015 | Hoashi et al. | |
| 2015/0168911 | A1 | 6/2015 | Kuruma et al. | |

FOREIGN PATENT DOCUMENTS

| | | | |
|---|---|---|---|
| JP | 2000-214654 | A | 8/2000 |
| JP | 2004-108481 | A | 4/2004 |
| JP | 2007-193125 | A | 8/2007 |
| JP | 2007-256663 | A | 10/2007 |
| JP | 2007-303615 | A | 11/2007 |

OTHER PUBLICATIONS

Aug. 4, 2020—U.S. Non-final Office Action—U.S. Appl. No. 16/864,215.

Nov. 10, 2021—U.S. Non-final Office Action—U.S. Appl. No. 17/236,637.

* cited by examiner

PROCESS CARTRIDGE INCLUDING FRAME HAVING PHOTOSENSITIVE DRUM, DRUM COUPLING AND FLANGED FIXED TO PHOTOSENSITIVE DRUM

CROSS REFERENCE TO RELATED APPLICATIONS

The present application is a continuation of prior U.S. application Ser. No. 17/388,904, filed Jul. 29, 2021, which is a continuation of prior U.S. application Ser. No. 17/236,637, filed Apr. 21, 2021 (now U.S. Pat. No. 11,385,565, issued Jul. 12, 2022), which is a continuation of prior U.S. application Ser. No. 16/935,978, filed Jul. 22, 2020 (now U.S. Pat. No. 11,016,410, issued May 25, 2021), which is a is a continuation of prior U.S. application Ser. No. 16/864,215, filed May 1, 2020 (now U.S. Pat. No. 10,928,748, issued Feb. 23, 2021), which is a continuation of prior U.S. application Ser. No. 16/573,249, filed Sep. 17, 2019 (now U.S. Pat. No. 10,678,162, issued Jun. 9, 2020), which is a continuation of prior U.S. application Ser. No. 16/161,186, filed Oct. 16, 2018, (now U.S. Pat. No. 10,451,995, issued Oct. 22, 2019), which is a continuation of prior U.S. application Ser. No. 15/705,344, filed Sep. 15, 2017, (now U.S. Pat. No. 10,139,749, issued Nov. 27, 2018), which is a continuation of prior U.S. application Ser. No. 15/280,707, filed Sep. 29, 2016, (now U.S. Pat. No. 9,791,804, issued Oct. 517, 2017), which is a continuation of prior U.S. application Ser. No. 14/927,602, filed Oct. 30, 2015, (now U.S. Pat. No. 9,471,003, issued Oct. 18, 2016), which is a continuation of prior U.S. application Ser. No. 14/556,885, filed Dec. 1, 2014, (now U.S. Pat. No. 9,182,732, issued Nov. 10, 2015), which is a continuation of prior U.S. application Ser. No. 13/946,588, filed Jul. 19, 2013 (now U.S. Pat. No. 8,903,280, issued Dec. 2, 2014), which is a continuation of prior U.S. application Ser. No. 13/244,367, filed Sep. 24, 2011 (now U.S. Pat. No. 8,498,554, issued Jul. 30, 2013), which is a continuation of prior U.S. application Ser. No. 12/340,867, filed Dec. 22, 2008 (now U.S. Pat. No. 8,068,767 B2, issued Nov. 29, 2011), which claims priority from Japanese Patent Application No. 2007-340760, which was filed on Dec. 28, 2007, the disclosures of which are herein incorporated by reference in their entirety.

TECHNICAL FIELD

Apparatuses and devices consistent with the present invention relate to an image forming apparatus such as an electro-photographic color printer and a process cartridge that is to be mounted in the image forming apparatus.

BACKGROUND

Japanese unexamined patent application publication No. JP-A-2000-214654 (Hereinafter, Patent document 1) describes a related art image forming apparatus. In the related art image forming apparatus such as an electrophotographic printer, a photosensitive unit having a photosensitive drum and a developing unit having a developing roller are mounted together in a process unit.

In the image forming apparatus of this type, a drive source for generating driving force for rotating the photosensitive drum and the developing roller is provided in an apparatus main body thereof. The process unit includes a drive input member for driving the photosensitive drum and a drive input member for driving the developing roller. In addition, coupling gearwheels are connected, respectively, to the drive input members, so that driving force from the drive source is inputted into the respective drive input members via their mating coupling gearwheels to thereby be transmitted to the photosensitive drum and the developing roller from their mating drive input members.

The respective coupling gearwheels can be connected or engaged with their mating drive input members when the process unit is disposed in a constant position. Because of this, in the event that the process unit is shifted with the respective coupling gearwheels kept engaged with their mating drive input members, the engagement between the respective drive input members and their mating coupling gearwheels is disengaged, the transmission of driving force from the respective coupling gearwheels to their mating drive input members becomes impossible.

SUMMARY

The invention has been made in view of these situations and an object thereof is to provide an image forming apparatus which enables the transmission of driving force to a drum drive input member and a developing drive input member even in the event that there occurs a positional gap of the drum drive input member and the developing drive input member.

In addition, the other object of the invention is to provide a process cartridge which enables the transmission of driving force to a drum drive input member and a process drive input member even in the event that there occurs a positional gap of the drum drive input member and the process drive input member.

Exemplary embodiments of the present invention address the above disadvantages and other disadvantages not described above. However, the present invention is not required to overcome the disadvantages described above, and thus, an exemplary embodiment of the present invention may not overcome any of the problems described above.

According to an aspect of the invention, there is provided an image forming apparatus comprising: a drum cartridge comprising a photosensitive drum and a drum drive input member into which drum driving force for rotating the photosensitive drum is inputted; a developing cartridge that is configured to be movably mounted to the drum cartridge, the developing cartridge comprising a developing roller disposed so as to face the photosensitive drum and a developing drive input member into which developing driving force for rotating the developing roller is inputted; a drum drive transmission member that is configured to engage with the drum drive input member and configured to transmit the drum driving force to the drum drive input member while permitting a positional gap of the drum drive input member within a predetermined range; and a developing drive transmission member that is configured to engage with the developing drive input member and configured to transmit the developing driving force to the developing drive input member while permitting a positional gap of the developing drive input member within a predetermined range.

Further, according to another aspect of the invention, there is provided a process cartridge comprising: a photosensitive drum; a process member that is configured to form a developer image on a surface of the photosensitive drum; a drum drive input member into which drum driving force for rotating the photosensitive drum is inputted; and a process drive input member into which process driving force for the process member is inputted, wherein a drum drive transmission member is brought into engagement with the drum drive input member such that the drum drive transmission member transmits the drum driving force to the drum drive input member while permitting a positional gap of the drum drive input member within a predetermined range, and wherein a process drive transmission member is brought into engagement with the process drive input member such that the process drive transmission member transmits the process driving force to the process drive input member while permitting a positional gap of the process drive input member within a predetermined range.

Further, according to another aspect of the invention, there is provided an image forming apparatus comprising: a drum unit comprising a photosensitive drum and a drum drive input member into which drum driving force for rotating the photosensitive drum is inputted; a developing unit comprising a developing roller disposed so as to face the photosensitive drum and a developing drive input member into which developing driving force for rotating the developing roller is inputted; a drum drive transmission member that is configured to engage with the drum drive input member and configured to transmit the drum driving force to the drum drive input member while permitting a positional gap of the drum drive input member within a predetermined range; and a developing drive transmission member that is configured to engage with the developing drive input member and configured to transmit the developing driving force to the developing drive input member while permitting a positional gap of the developing drive input member within a predetermined range.

Further, according to another aspect of the invention, there is provided an image forming apparatus comprising: a body casing; a plurality of process cartridges detachably mounted in the main casing along a first direction, each of the process cartridges comprising: a photosensitive drum; a first drum coupling member into which drum driving force for rotating the photosensitive drum is inputted; a developing roller disposed so as to face the photosensitive drum; and a first developing coupling member into which developing driving force for rotating the developing roller is inputted, a second drum coupling member that is disposed such that a rotation axis of the second drum coupling member is substantially coincident with a rotation axis of the first drum coupling member when viewed from an axial direction of the second drum coupling member, the second drum coupling member configured to transmit the drum driving force to the first drum coupling member while permitting a positional gap of the first drum coupling member within a predetermined range, the second drum coupling member provided so as to be movable along a drum second direction, between a drum advance position where the second drum coupling member advances to the first drum coupling member to be brought into engagement with the first drum coupling member and a drum retreat position where the second drum coupling member retreats from the first drum coupling member to be disengaged from the first drum coupling member, the drum second direction being substantially perpendicular to the first direction; and a second developing coupling member that is disposed such that a rotation axis of the second developing coupling member is substantially coincident with a rotation axis of the first developing coupling member when viewed from an axial direction of the second developing coupling member, the second developing coupling member configured to transmit the developing driving force to the first developing coupling member while permitting a positional gap of the first developing coupling member within a predetermined range, the second developing coupling member provided so as to be movable along a developing second direction, between a developing advance position where the second developing coupling member advances to the first developing coupling member to be brought into engagement with the first developing coupling member and a developing retreat position where the second developing coupling member retreats from the first developing coupling member to be disengaged from the first developing coupling member, the developing second direction being substantially perpendicular to the first direction.

BRIEF DESCRIPTION OF THE DRAWINGS

Exemplary embodiments of the invention will be described in detail with reference to the following figures wherein.

DETAILED DESCRIPTION OF EXEMPLARY EMBODIMENTS OF THE PRESENT INVENTION

1. Overall Configuration of Printer

Figure 1:
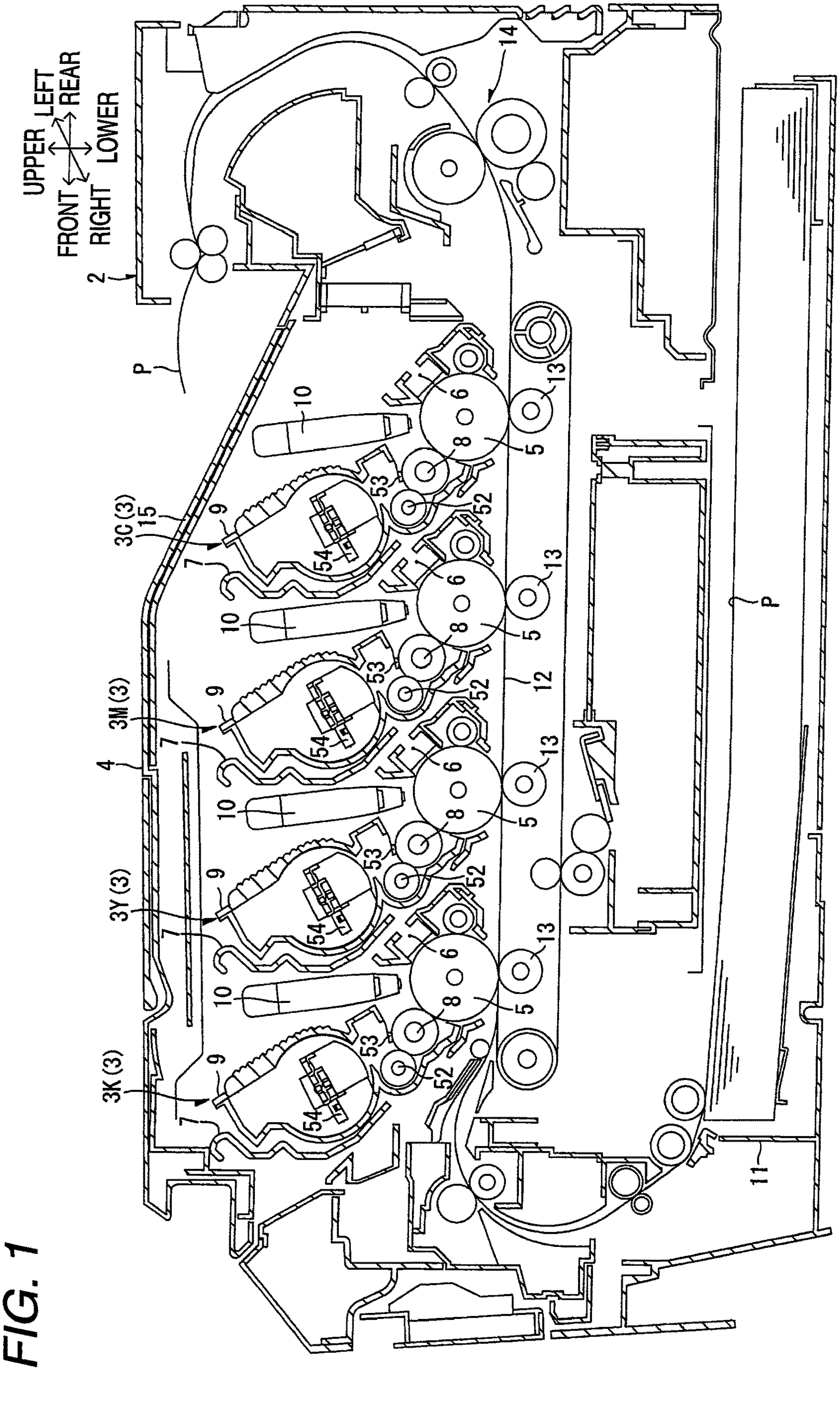
FIG. 1 is a side sectional view showing an image forming apparatus according to an exemplary embodiment of the invention.

FIG. 1 is a side sectional view showing an image forming apparatus according to an exemplary embodiment of the invention. The image forming apparatus is embodied in a printer.

A printer 1 is a tandem type color printer. Four process cartridges 3 are disposed in parallel within a body casing 2 as an example of an apparatus main body in such a manner as to be associated with respective colors of black, yellow, magenta and cyan. The respective process cartridges 3 can be mounted in and dismounted from the body casing 2 in such a state that a top cover 4 which is an example of a cover at an upper side of the body casing 2 is opened.

Each of the process cartridges 3 includes a drum cartridge 7 which holds therein a photosensitive drum 5 and a scorotron-type charger 6 and a developing cartridge 9 which holds therein a developing roller 8 and which is detachably attached to the drum cartridge 7. A surface of the photosensitive drum 5 is charged uniformly by the scorotron-type charger 6 and is then exposed selectively by LEDs provided in a LED unit 10. Accordingly, latent images based on image data are formed on the surfaces of the photosensitive drums 5 by static electric charges imparted thereto. The respective static latent images so formed are then visualized by toner carried on the developing rollers 8, whereby toner images are formed on the surfaces of the photosensitive drums 5.

Sheets P are accommodated in a feeding cassette 11 disposed in a bottom part of the body casing 2. Sheets P accommodated in the feeding cassette 11 are conveyed sheet by sheet onto a conveyer belt 12 by various types of rollers. The conveyer belt 12 is disposed in such a manner as to confront the four photosensitive drums 5 from therebelow. A sheet P conveyed onto the conveyer belt 12 is conveyed to pass sequentially underneath the respective photosensitive drums 5 when the conveyer belt 12 is caused to run. Then, the toner images on the surfaces of the photosensitive drums 5 are transferred onto the sheet P by virtue of a transfer bias applied to transfer rollers 13. The transfer rollers 13 are disposed in such a manner as to correspond to the respective photosensitive drums 5 across the conveyer belt 12.

The sheet P on to which the toner images have been transferred is then conveyed to a fixing unit 14. The toner images transferred on to the sheet P are thermally fixed in the fixing unit 14. Thereafter, the sheet P is discharged into a sheet discharging tray 15 by various types of rollers.

Note that when discriminating a process cartridge 3 of a specific color from process cartridges 3 of the other colors, reference characters, such as K denoting black, Y denoting yellow, M denoting magenta and C denoting cyan, are used after the reference numeral 3 denoting the process cartridges to indicate a process cartridge of a certain color. For example, process cartridge 3K denotes the process cartridge loaded with black color toner.

In addition, an upstream side of a conveying direction of a sheet P by the conveyer belt 12 is referred to as a front side of the printer 1, and when the printer is described with respect to its horizontal or left and right positions, those positions are generally based on the printer 1 as viewed from a front side thereof. With respect to the process cartridge 3, in such a state that the process cartridge 3 is disposed horizontally, a side where the developing cartridge 9 is disposed to face the photosensitive drum 5 is referred to as a front side, and in some cases, when the process cartridge 3 is described with respect to its vertical or upper and lower positions, as well as right and left position, those positions are based on the process cartridge 3 as viewed from the front side. Arrows denoting front-back, up-down and right-left directions are depicted in the respective drawings.

2. Process Cartridge

Figure 2:
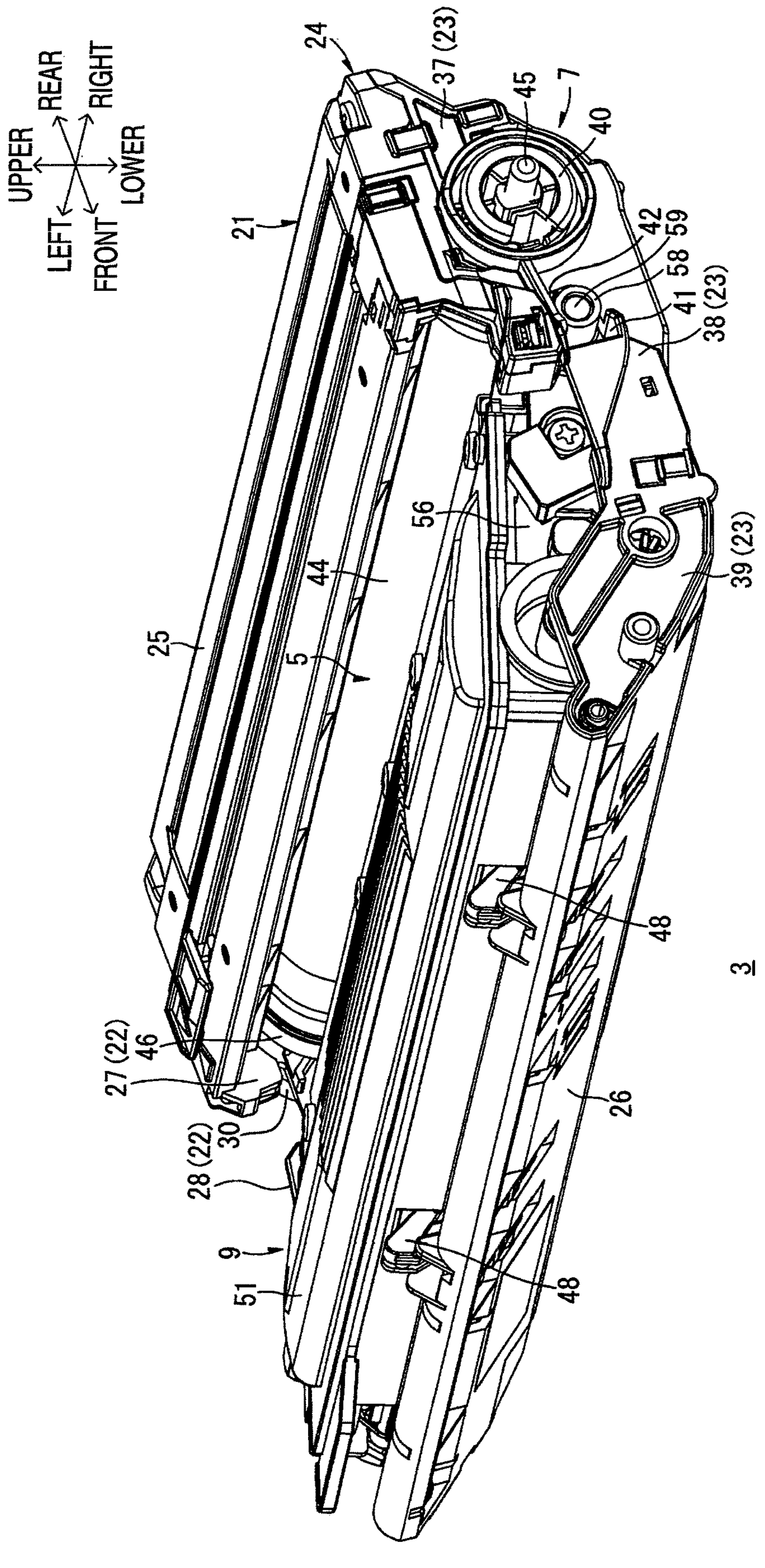
FIG. 2 is a perspective view of a process cartridge of the image forming apparatus of FIG. 1, as viewed from a right front direction of the process cartridge.
Figure 3:
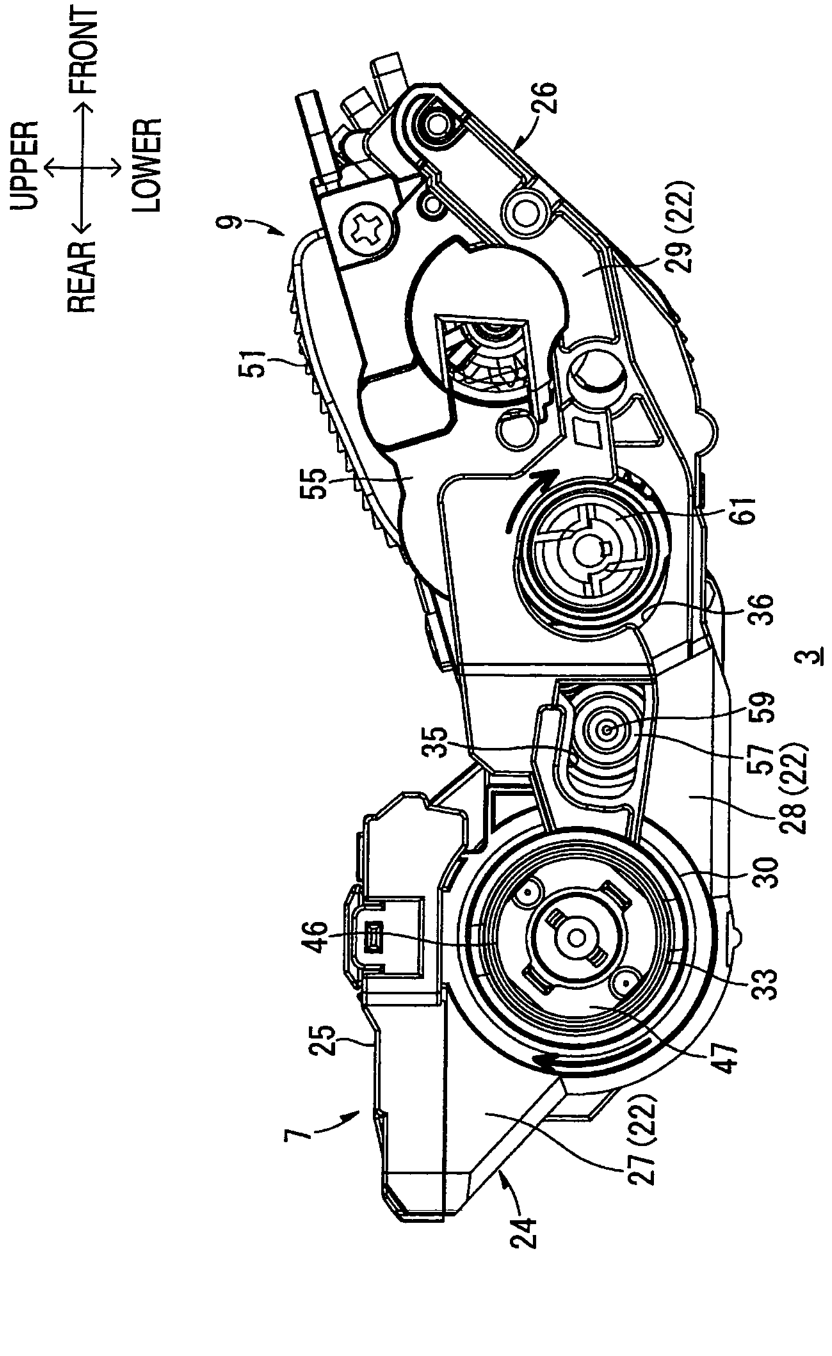
FIG. 3 is a left side view of the process cartridge of FIG. 2.
Figure 4:
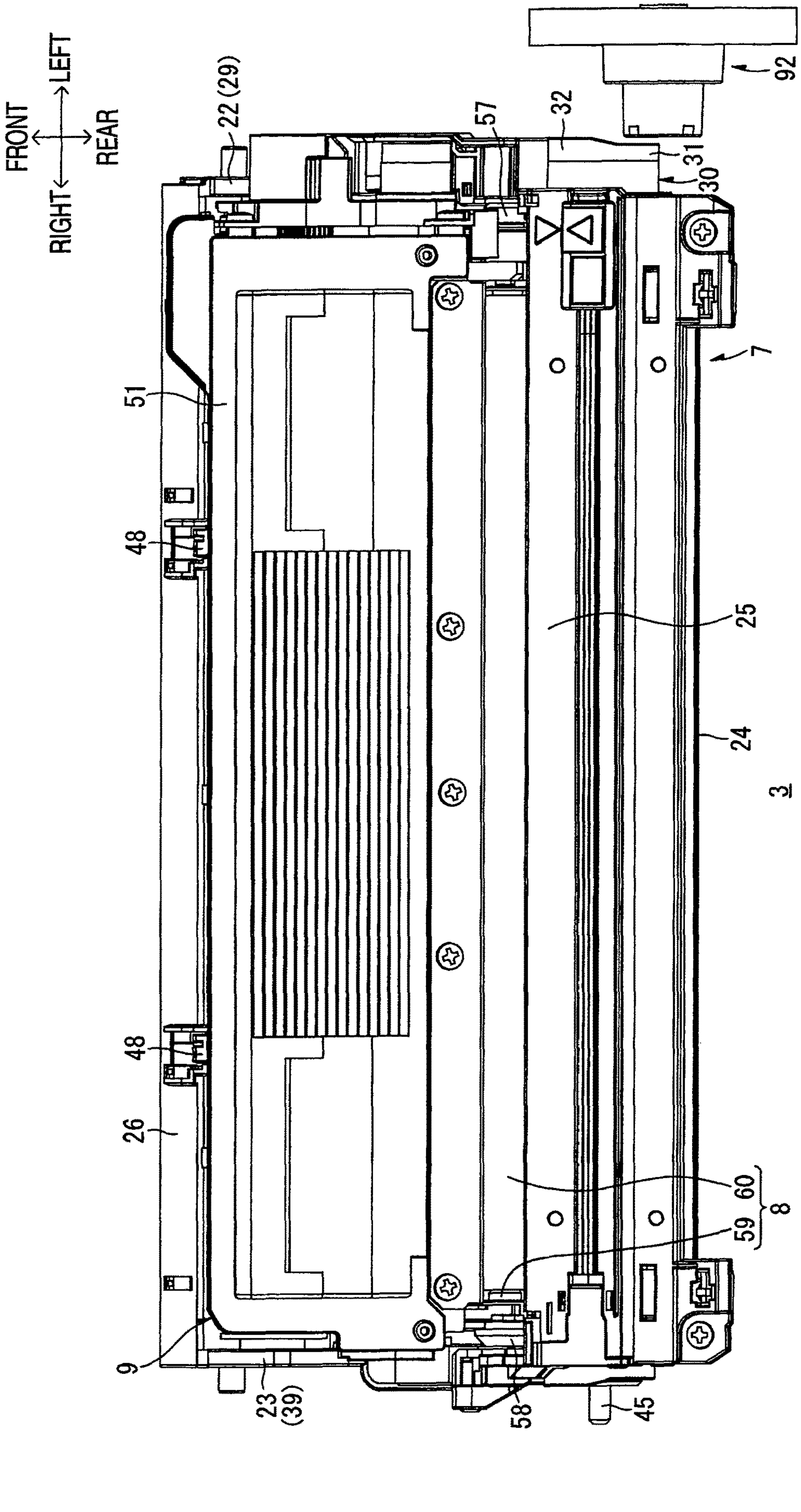
FIG. 4 is a plan view of the process cartridge of FIG. 2.
Figure 5:
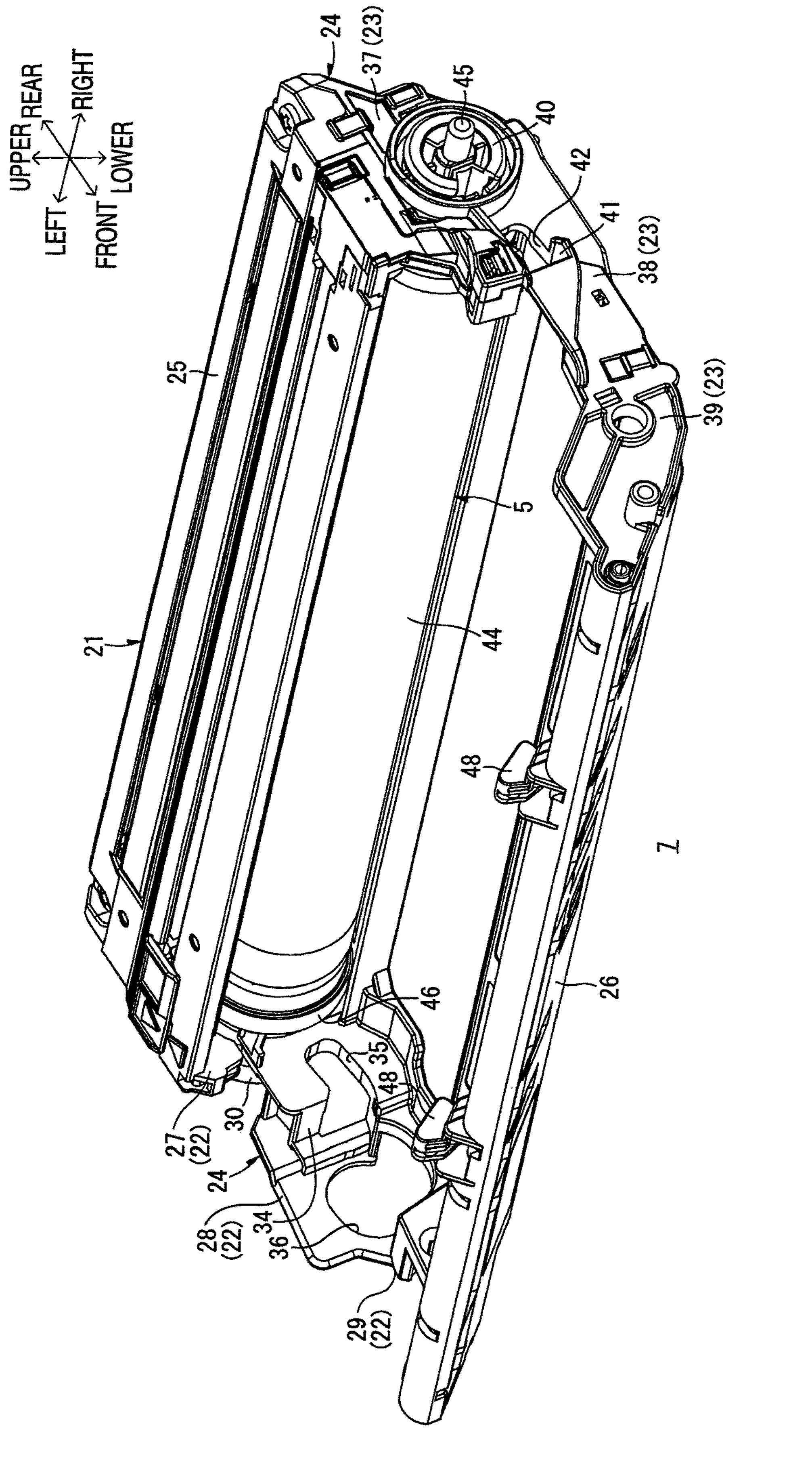
FIG. 5 is a perspective view of a drum cartridge of the process cartridge of FIG. 2, as viewed from a right front direction of the drum cartridge.

FIG. 2 is a perspective view of the process cartridge 3 of the image forming apparatus of FIG. 1, as viewed from a right front direction thereof. FIG. 3 is a left side view of the process cartridge. FIG. 4 is a plan view of the process cartridge. FIG. 5 is a perspective view of a drum cartridge 7 of the process cartridge of FIG. 2, as viewed from a right front direction thereof.

(1) Drum Cartridge

As is shown in FIG. 5, the drum cartridge 7 includes a drum frame 21. The drum frame 21 has integrally a pair of drum side walls 22, 23, a drum rear wall 24, a drum upper wall 25 and a drum front wall 26.

The pair of drum side walls 22, 23 is disposed in such a manner as to confront each other with a space provided in the right-left direction.

As is shown in FIG. 3, the drum side wall 22 on the left-hand side includes a left-hand side wall rear portion 27, a left-hand side wall intermediate portion 28 and a left-hand side wall front portion 29.

The left-hand side wall rear portion 27 has a substantially triangular shape as viewed from the side. A substantially cylindrical protecting portion 30 is formed on the left-hand side wall rear portion 27 in such a manner as to project outwardly sideways (leftwards). The protecting portion 30 projects, as is shown in FIG. 4, in such a manner that a projecting amount of a rear-side portion 31 becomes less than a projecting amount of a front-side portion 32. In addition, an end face of the front-side portion 32 and an end face of the rear-side portion 31 are connected to each other via an inclined surface which is inclined closer to the left-hand side wall rear portion 27 as the inclined surface extends rearwards. In addition, a penetrating hole is formed in the left-hand side wall rear portion 27 at a portion which is surrounded by the protecting portion 30, and a left drum bearing 33 is fitted in the penetrating hole so formed.

The left-hand side wall intermediate portion 28 has a substantially rectangular shape as viewed from the side which is lower in height than the left-hand side wall rear portion 27 and, as is shown in FIG. 5, the left-hand side wall intermediate portion 28 extends forwards from a front end lower portion of the left-hand side wall rear portion 27, bends outwardly sideways at an intermediate portion along a length in a front-rear direction thereof, and bends again to the front to extend forwards further. In addition, an opening is formed in the left-hand side wall intermediate portion 28 at a bent portion 34 which lies intermediate along the length of the left-hand side wall intermediate portion 28 and which is bent outwards, and by cutting out a portion of the left-hand side wall intermediate portion 28 which extends from the opening to a position lying rewards than the bent portion 34 in such a manner that a resulting external shape has a substantially U-shape, an attachment guide groove 35 is formed. A plane which includes an upper surface of the attachment guide groove 35 passes through a rotational center of a developing roller drive gear 61, which will be described later, as is shown in FIG. 3 in such a state that the developing cartridge 9 is attached to the drum cartridge 27. In addition, an elongated hole 36 in which a diameter in the front-rear direction is slightly larger than a diameter in the up-down direction is formed in the left-hand side wall intermediate portion 28 at a portion which lies further forwards than the bent portion.

The left-hand side wall front portion 29 is formed in such a manner as to extend obliquely upwards from an edge of a front end of the left-hand side wall intermediate portion 28 as the left-hand side wall front portion 29 extends forwards.

As is shown in FIG. 5, the drum side wall 23 on the right-hand side includes a right-hand side wall rear portion 37, a right-hand side wall intermediate portion 38 and a right-hand side wall front portion 39.

The right-hand side wall rear portion 37 has a substantially triangular shape as viewed from the side and is made to confront the left-hand side wall rear portion 27 in the right-left direction. A right drum bearing 40 is attached to the right-hand side wall rear portion 37.

The right-hand side wall intermediate portion 38 has a substantially rectangular shape as viewed from the side which is lower in height than the right-hand side wall rear portion 37 and, as is shown in FIG. 5, the right-hand side wall intermediate portion 38 extends forwards from a front end lower portion of the right-hand side wall rear portion 37, bends outwardly sideways at an intermediate portion along a length in a front-rear direction thereof, and bends again to the front to extend forwards further. In addition, an opening is formed in the right-hand side wall intermediate portion 38 at a bent portion 41 which lies intermediate along the length of the right-hand side wall intermediate portion 38 and which is bent outwards, and by cutting out a portion of the right-hand side wall intermediate portion 38 which extends from the opening to a position lying rewards than the bent portion 41 in such a manner that a resulting external shape has a substantially U-shape, an attachment guide groove 42 is formed. The attachment guide groove 42 is made to confront the attachment guide groove 35 in the left-hand side wall intermediate portion 28 in the right-left direction, and an upper surface of the attachment guide groove 42 is positioned on the same plane as that on which the upper surface of the attachment guide groove 35 is positioned.

The right-hand side wall front portion 39 is formed in such a manner as to extend obliquely upwards from an edge of a front end of the right-hand side wall intermediate portion 38 as the right-hand side wall front portion 39 extends forwards.

The photosensitive drum 5 is held by the left-hand side wall rear portion 27 of the drum side wall 22 and the right-hand side wall rear portion 37 of the drum side wall 23. The photosensitive drum 5 includes a drum main body 44 and a drum shaft 45 which extends along a center axis of the drum main body 44. Flange members 46 (a right-hand flange member 46 is not shown) are fixed to both end portions of the drum main body 44, and the drum shaft 45 is inserted into centers of the respective flange members 46 in such a manner as to rotate relatively. A right end portion of the drum shaft 45 is inserted into the right drum bearing 40 in such a manner that a relative rotation thereof to the drum bearing 40 is prohibited. The right end portion projects rightwards from the right drum bearing 40. On the other hand, the flange member 46 fixed to a left end portion of the drum main body 44 is held in the left drum bearing 33 in such a manner that a relative rotation thereof to the drum bearing 33 is allowed. Thus, the drum main body 44 of the photosensitive drum 5 is provided rotatably about the drum shaft 45 between the left-hand side wall rear portion 27 and the right-hand side wall rear portion 37.

In addition, an end face of the left-hand flange member 46 is exposed in the portion surrounded by the protecting portion 30. Then, a connecting member 47 is attached to the exposed end face of the flange member 46 (refer to FIG. 3).

The drum rear wall 24 is provided in such a manner as to extend between a rear end portion of the drum side wall 22 and a rear end portion of the drum side wall 23.

The drum upper wall 25 is provided in such a manner as to extend between an upper end portion of the left-hand side wall rear portion 27 of the drum side wall 2 and an upper end portion of the right-hand side wall rear portion 37 of the drum side wall 23.

The drum front wall 26 is provided in such a manner as to extend between a lower end portion of the left-hand side front portion 29 of the drum side wall 22 and a lower end portion of the right-hand side front portion 39 of the drum side wall 23 and is formed in such a manner as to be inclined obliquely upwards as the drum front wall 26 extends forwards. Pressing levers 48 for pressing the developing cartridge 9 towards the photosensitive drum 5 are provided in two locations on the drum front wall 26 which confront each other in a right-left direction of the drum front wall 26 across a central portion thereof.

(2) Developing Cartridge

As is shown in FIGS. 2 to 4, the developing cartridge 9 is disposed between the left-hand side wall intermediate portion 28 and the left-side wall front portion 29 of the drum side wall 22 and the right-hand side wall intermediate portion 38 and the right-hand side wall front portion 39 of the drum side wall 23 in such a state that the developing cartridge 9 is attached to the drum cartridge 7.

The developing cartridge 9 includes a housing 51. The housing 51 has a box shape which is opened at a rear side thereof. As is shown in FIG. 1, a developing roller 8, a supply roller 52, a layer thickness control blade 53 and an agitator 54 are included in the housing 51. In addition, toner is accommodated within the housing 51.

As is shown in FIG. 4, the developing roller 8 is disposed in such a manner as to be exposed to the rear from the housing 51 and is supported rotatably on both side walls 55, 56 of the housing 51. Specifically, as is shown in FIGS. 2 and 3, developing roller shaft bearing members 57, 58, which are substantially cylindrical, are provided at rear end portions of both the side walls 55, 56 in such a manner as to project outwardly sideways. The developing roller shaft bearing members 57, 58 are disposed in positions which confront each other in the right-left direction. As is shown in FIG. 4, the developing roller 8 has a configuration in which a metallic developing roller shaft 59 is covered with a rubber roller 60 which is made from a conductive rubber. The developing roller 8 is supported rotatably on both the side walls 55, 56 by both end portions of the developing roller shaft 59 being inserted rotatably in the developing roller shaft bearing members 57, 58, respectively.

In addition, as is shown in FIG. 3, the developing roller drive gear 61 to which a driving force for driving the developing roller 8 and the like is inputted is provided rearwards of the developing roller shaft bearing member 57 on the left-hand side wall 55 of the housing 51. The developing roller drive gear 61 is made to confront the elongated hole 36 formed in the drum side wall 22 of the drum cartridge 7 in such a state that the developing cartridge 9 is attached to the drum cartridge 7. A rotational force acting in a clockwise direction as viewed in FIG. 3 is inputted to the developing roller drive gear 61.

(3) Attachment of Developing Cartridge to Drum Cartridge

The developing cartridge 9 is attached to the drum cartridge 7 from the front of the photosensitive drum 5. The developing roller shaft bearing members 57, 58 which project, respectively, leftwards and rightwards from the housing 51 of the developing cartridge 9 are fitted in the attachment guide grooves 35, 42, respectively. Then, by the developing cartridge 9 being pressed to the rear, the developing cartridge 9 is moved to the rear while the developing roller shaft bearing members 57, 58 are guided by the attachment guide grooves 35, 42, respectively. In the process of this rearward movement, the housing 51 of the developing cartridge 9 is brought into abutment with the pressing levers 48, and the housing 51 is pressed downwards against the pressing force exerted by the pressing levers 48, whereby the attachment of the developing cartridge 9 to the drum cartridge 7 is completed. In this state, in the developing cartridge 9, the developing roller 8 is brought into press contact with the photosensitive drum 5 by virtue of the pressing force of the pressing levers 48. Note that in a state in which the attachment has been completed, gaps are formed between the developing roller shaft bearing members 57, 58 and rear end portions of the guide grooves 35, 42, respectively.

3. Body Frames

Figure 6:
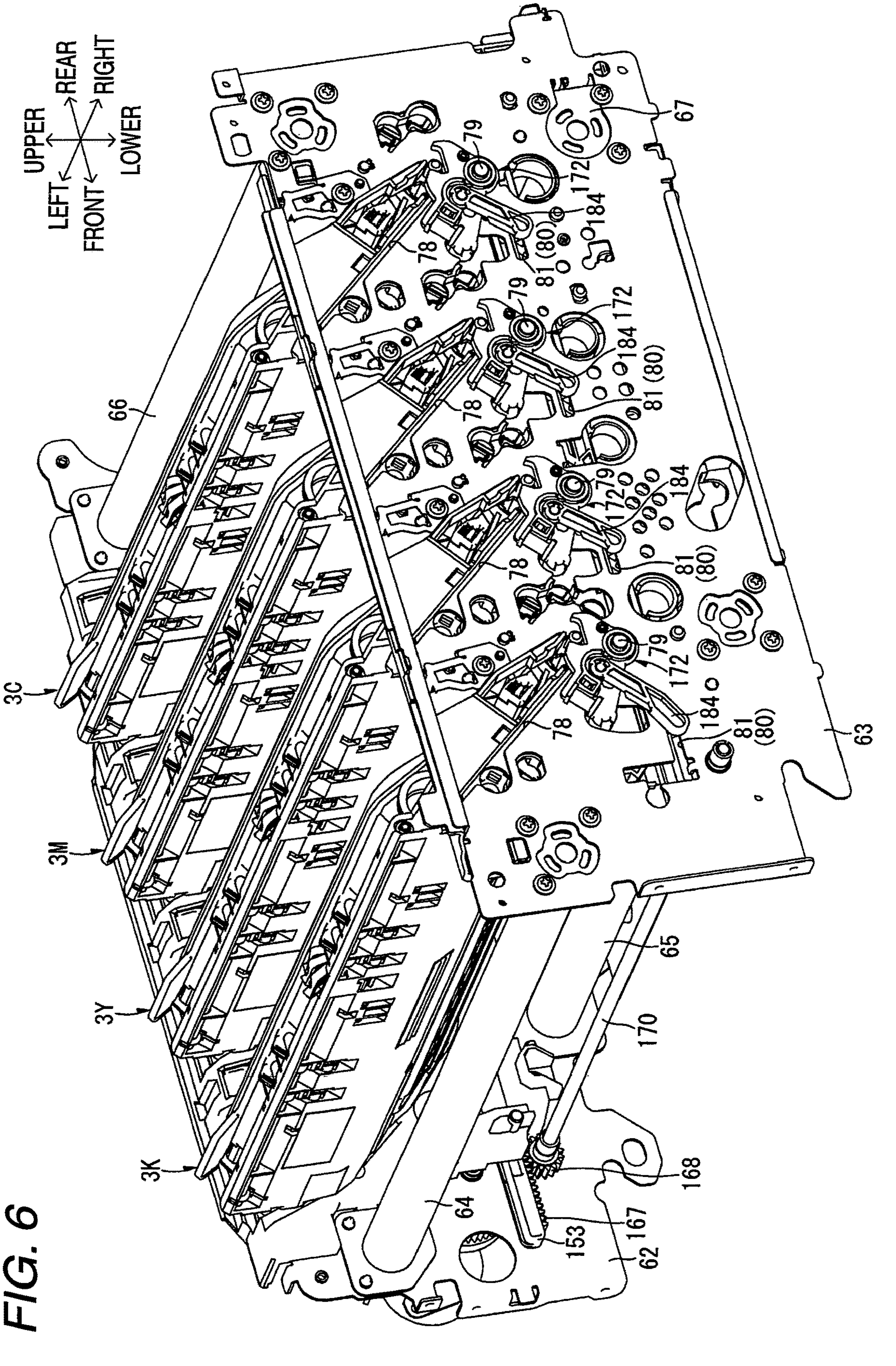
FIG. 6 is a perspective view of an interior of a body casing of the image forming apparatus of FIG. 1, as viewed from a right front direction of the body casing.

FIG. 6 is a perspective view of an interior of the body casing as viewed from a right front direction thereof.

Two body frames 62, 63 are disposed within the body casing 2 in such a manner as to face each other with a space provided therebetween. Each of the body frames 62, 63 has a substantially rectangular shape as viewed from the side. A black process cartridge 3K, a yellow process cartridge 3Y, a magenta process cartridge 3M and a cyan process cartridge 3C are mounted in this order as viewed from the front side between the body frames 62, 63.

The body frames 62, 63 are connected together via four round-rod shaped connecting members 64, 65, 66, 67. The connecting member 64 is provided at the front of the black process cartridge 3*k* in such a manner as to extend between respective upper end portions of the body frame 62, 63. The connecting member 65 is provided below the black process cartridge 3K in such a manner as to extend between respective lower end portions of the body frames 62, 63. The connecting member 66 is provided at the front of the cyan process cartridge 3C in such a manner as to extend between the respective upper end portions of the body frames 62, 63. The connecting member 67 is provided at the front of the cyan process cartridge 3C in such a manner as to extend between the respective lower end portions of the body frames 62, 63. Thus, the body frames 62, 63 and the four connecting members 64 to 67 provide a robust and strong structure which reduces strain and deformation when the process cartridges 3 are mounted or dismounted.

(1) Left-Hand Body Frame

Figure 7:
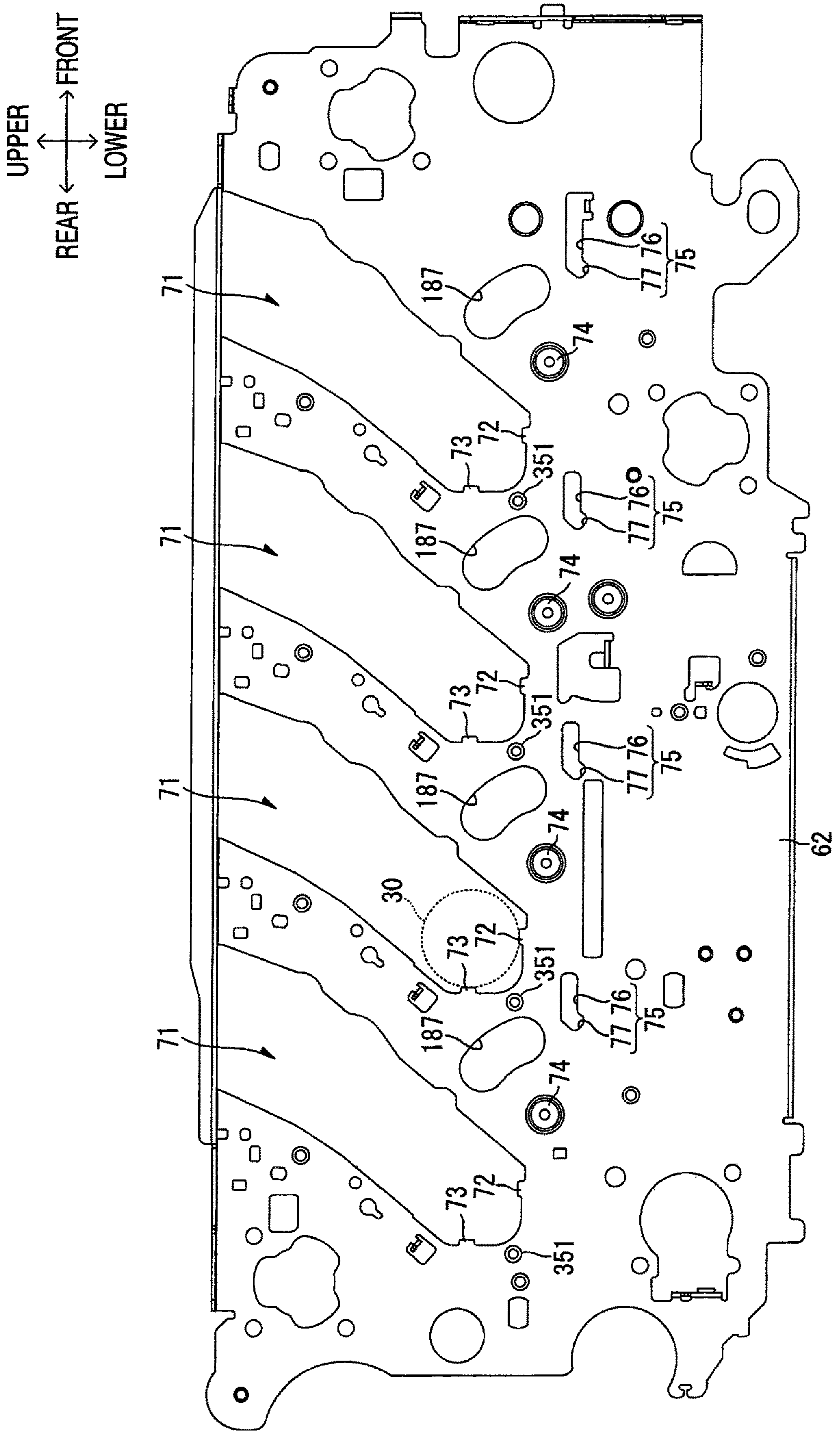
FIG. 7 is a left side view of a left-hand body frame of the body casing of FIG. 6.

FIG. 7 is a left side view of a left-hand body frame.

Four process cartridge guide grooves 71 are formed on the left-hand body frame 62. The process cartridge guide grooves 71 are formed by cutting out the body frame 62 from an upper edge thereof. Each of the process cartridge guide grooves 71 has a width corresponding to an outside diameter of the protecting portion 30 formed on the drum frame 21 and extends obliquely downwards and rearwards from the upper edge of the body frame 62 to a vertically central portion thereof. A first abutment portion 72 having a substantially rectangular shape as viewed from the side which projects upwards within the process cartridge guide groove 71 and a second abutment portion 73 having a substantially rectangular shape as viewed from the side which projects forwards within the process cartridge guide groove 71 are formed at a lower end portion of the process cartridge guide groove 71. The four process cartridge guide grooves 71 are formed at equal intervals in the front-rear direction.

In addition, cylindrical projecting portions 74 which project leftwards are provided, respectively, in positions on the body frame 62 which are spaced apart obliquely downwards and forwards from respective lower end portions of the process cartridge guide grooves 71.

Furthermore, guide holes 75 which penetrate through the body frame 62 are formed, respectively, in positions on the body frame 62 which are spaced apart forwards and slightly obliquely downwards from the respective projecting portions 74. The guide hole 75 has a linear hole portion 76 which extends in the front-rear direction and an intersecting hole portion 77 which extends obliquely downwards and rearwards from a rear end of the linear hole portion 76. In the frontmost guide hole 75 of the four guide holes 75, the linear hole portion 76 is formed longer than the linear hole portions 76 of the other guide holes 75.

In addition, arc-shaped holes 187 which are centered, respectively, at the projecting portions 74 are formed in positions on the body frame 62 which lie in front of the respective process cartridge guide grooves 71 and which are spaced apart obliquely upwards and forwards from the respective projecting portions 74.

(2) Right-Hand Body Frame

As is shown in FIG. 6, four process cartridge guide grooves 78 are formed on the right-hand body frame 63 in positions which confront, respectively, the four process cartridge guide grooves 71 formed on the left-hand body frame 62 in the right-left direction. The guide grooves 78 are formed by cutting out the body frame 63 from an upper edge thereof and extend obliquely downwards and rearwards from the upper edge to a vertically central portion of the body frame 63, while getting narrower as they extend downwards.

In addition, cylindrical projecting portions 79 which project rightwards are provided, respectively, in positions on the body frame 63 which are spaced apart obliquely downwards and forwards from respective lower end portions of the guide grooves 78.

Guide holes 80 which penetrate through the body frame 63 are formed, respectively, in positions on the body frame 63 which are spaced apart forwards and slightly obliquely downwards from the respective projecting portions 79. The guide hole 80 has a linear hole portion 81 which extends in the front-rear direction and an intersecting hole portion 81 which extends obliquely downwards and rearwards from a rear end of the linear hole portion 80. In the frontmost guide hole 80 of the four guide holes 80, the linear hole portion 81 is formed longer than the linear hole portions 81 of the other guide holes 80.

4. Configuration for Transmission of Drive Force to Process Cartridges

Figure 8:
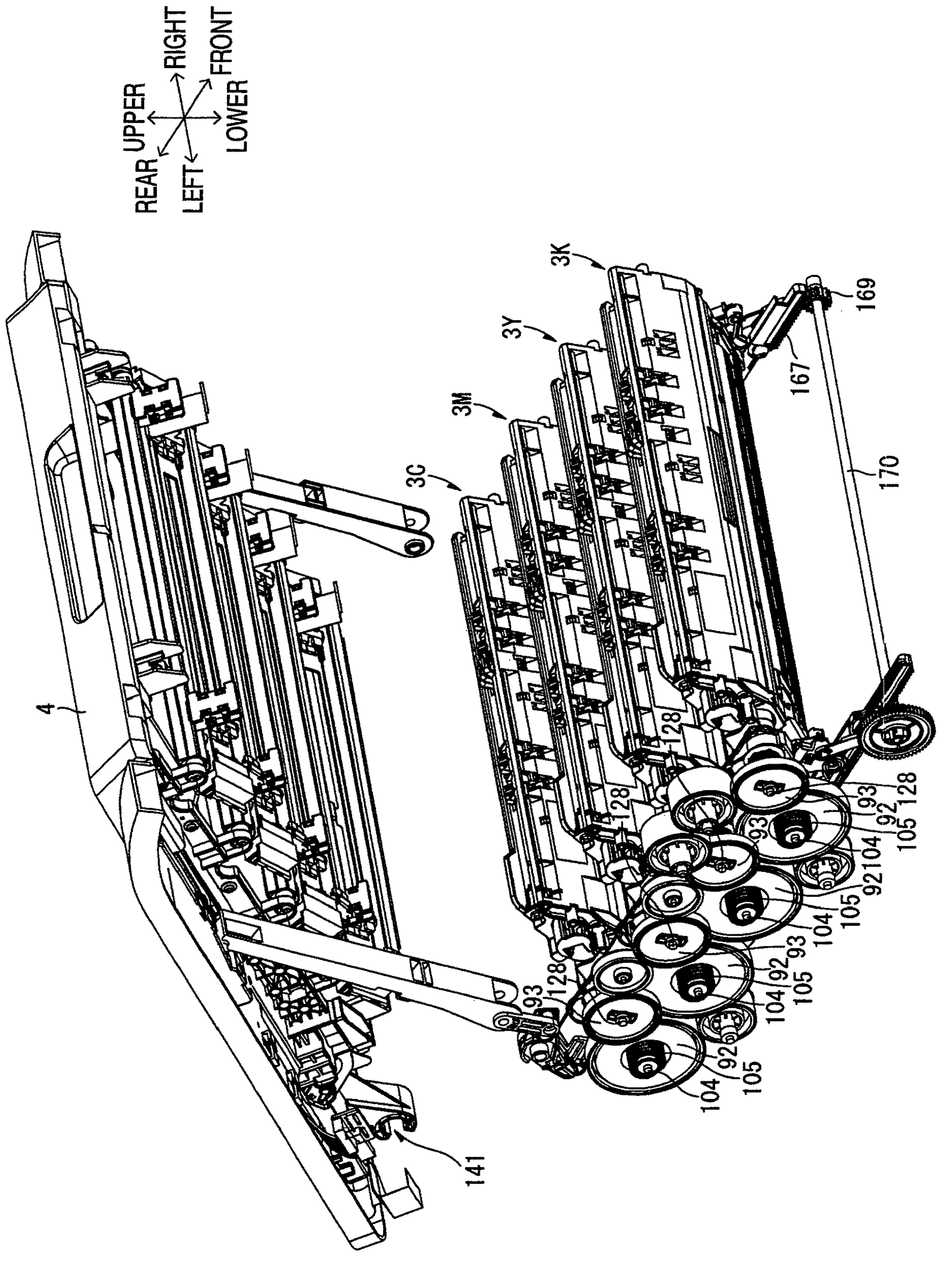
FIG. 8 is a perspective view of a driving force transmission mechanism and a first cover linkage mechanism of the image forming apparatus of FIG. 1, as viewed from a left front direction of the driving force transmission mechanism and the first cover linkage mechanism.
Figure 9:
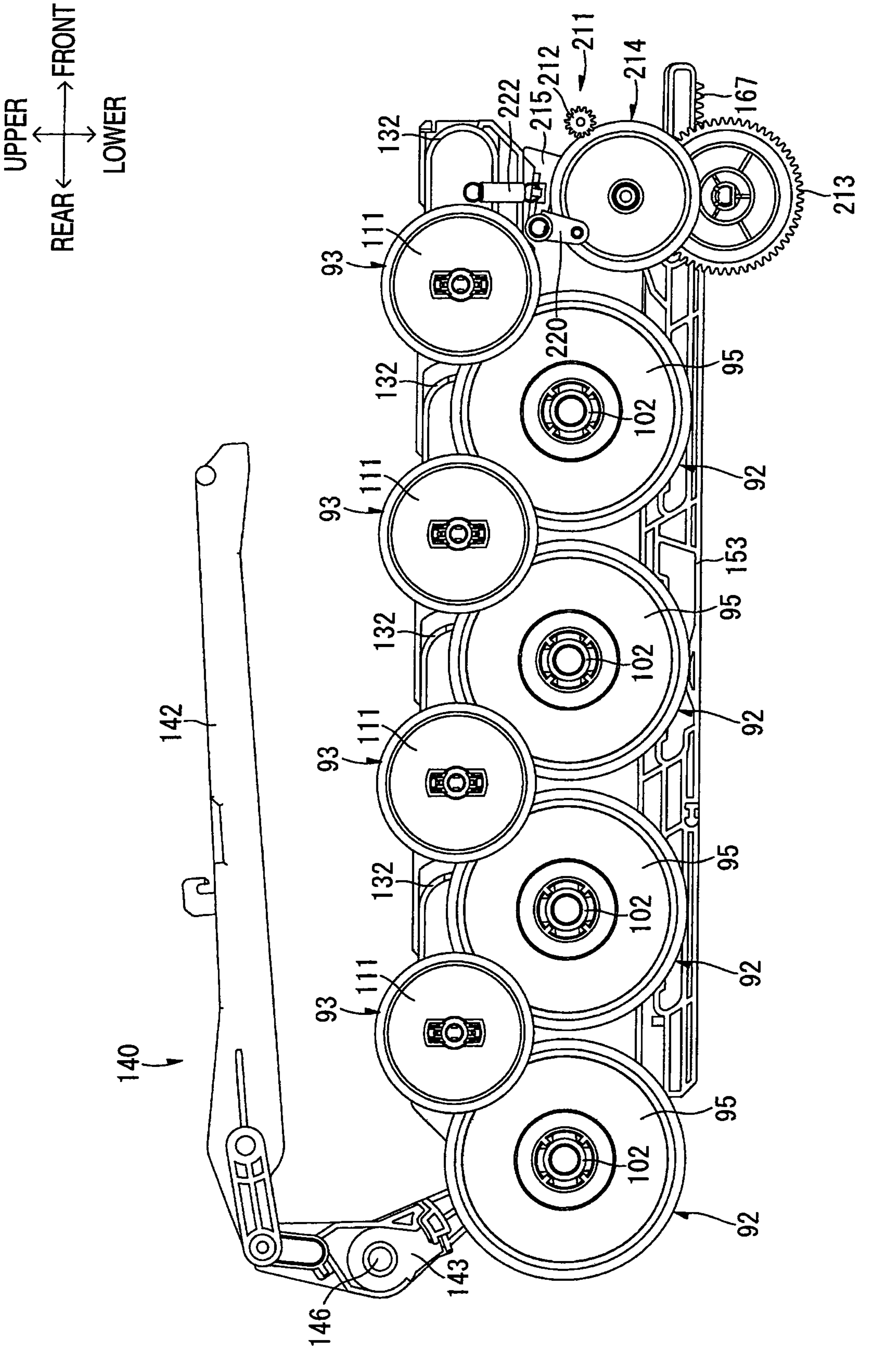
FIG. 9 is a left side view of the driving force transmission mechanism and the first cover linkage mechanism of FIG. 8, showing a state in which a top cover is closed.
Figure 10:
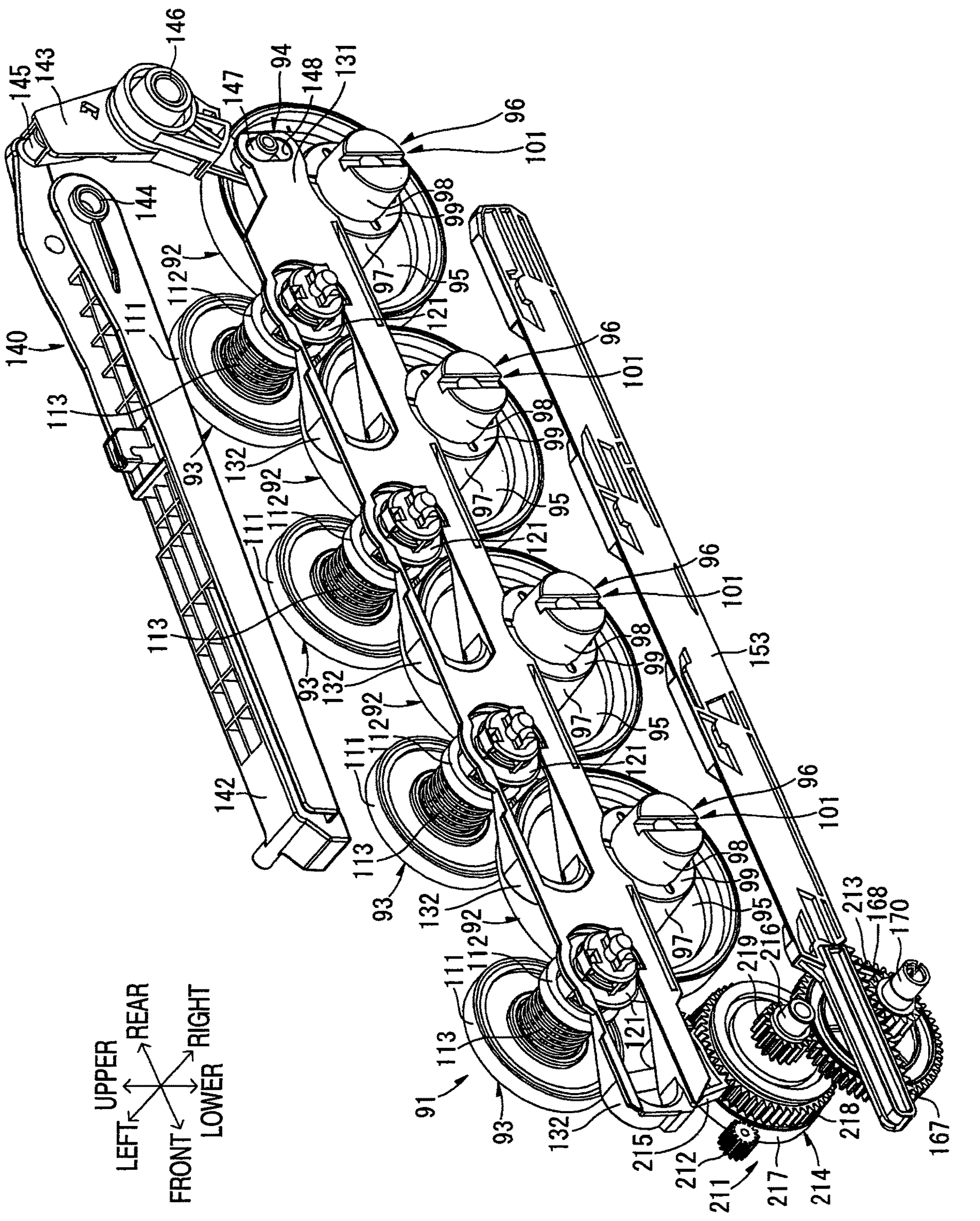
FIG. 10 is a perspective view of the driving force transmission mechanism and the first cover linkage mechanism of FIG. 8, as viewed from a right front direction thereof, showing the state in which the top cover is closed.
Figure 11:
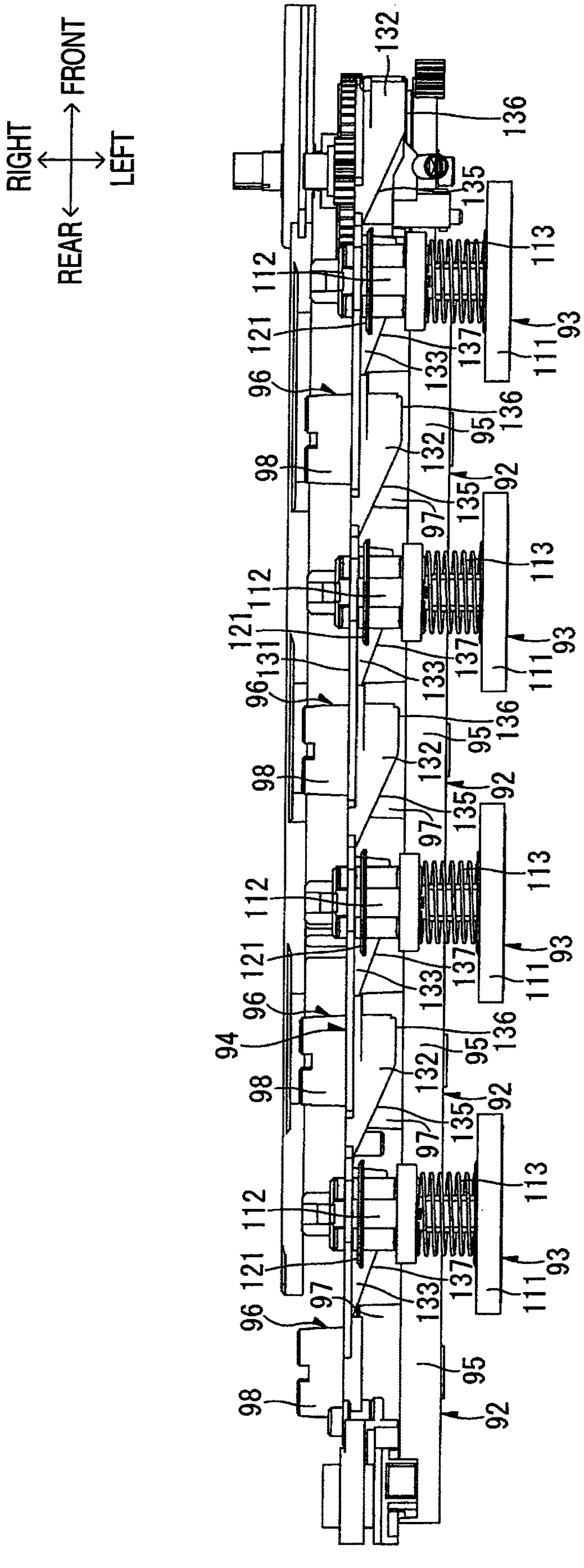
FIG. 11 is a plan view of the driving force transmission mechanism of FIG. 8, showing the state in which the top cover is closed.
Figure 12:
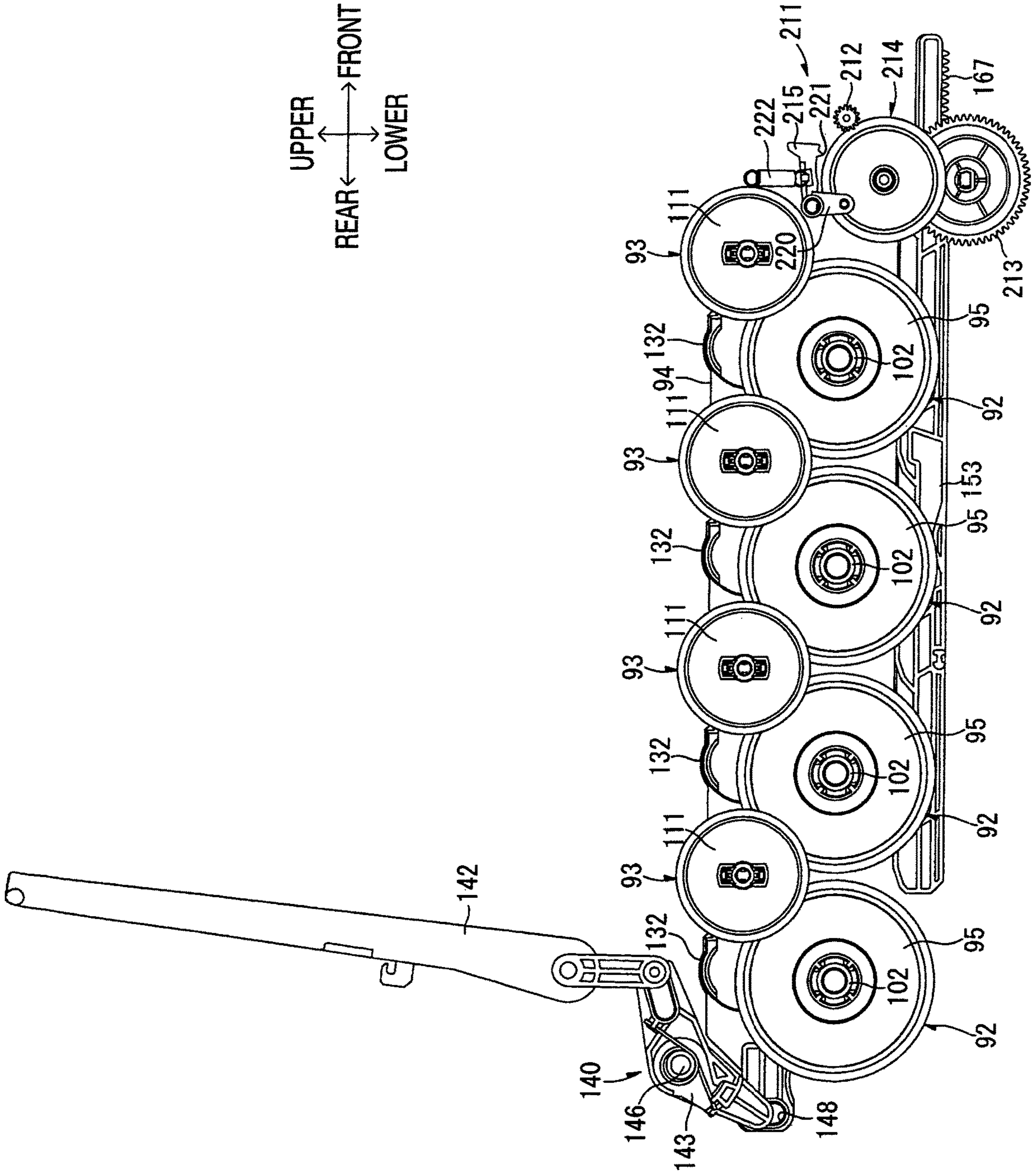
FIG. 12 is a left side view of the driving force transmission mechanism and the first cover linkage mechanism of FIG. 8, showing a state in which the top cover is opened.
Figure 13:
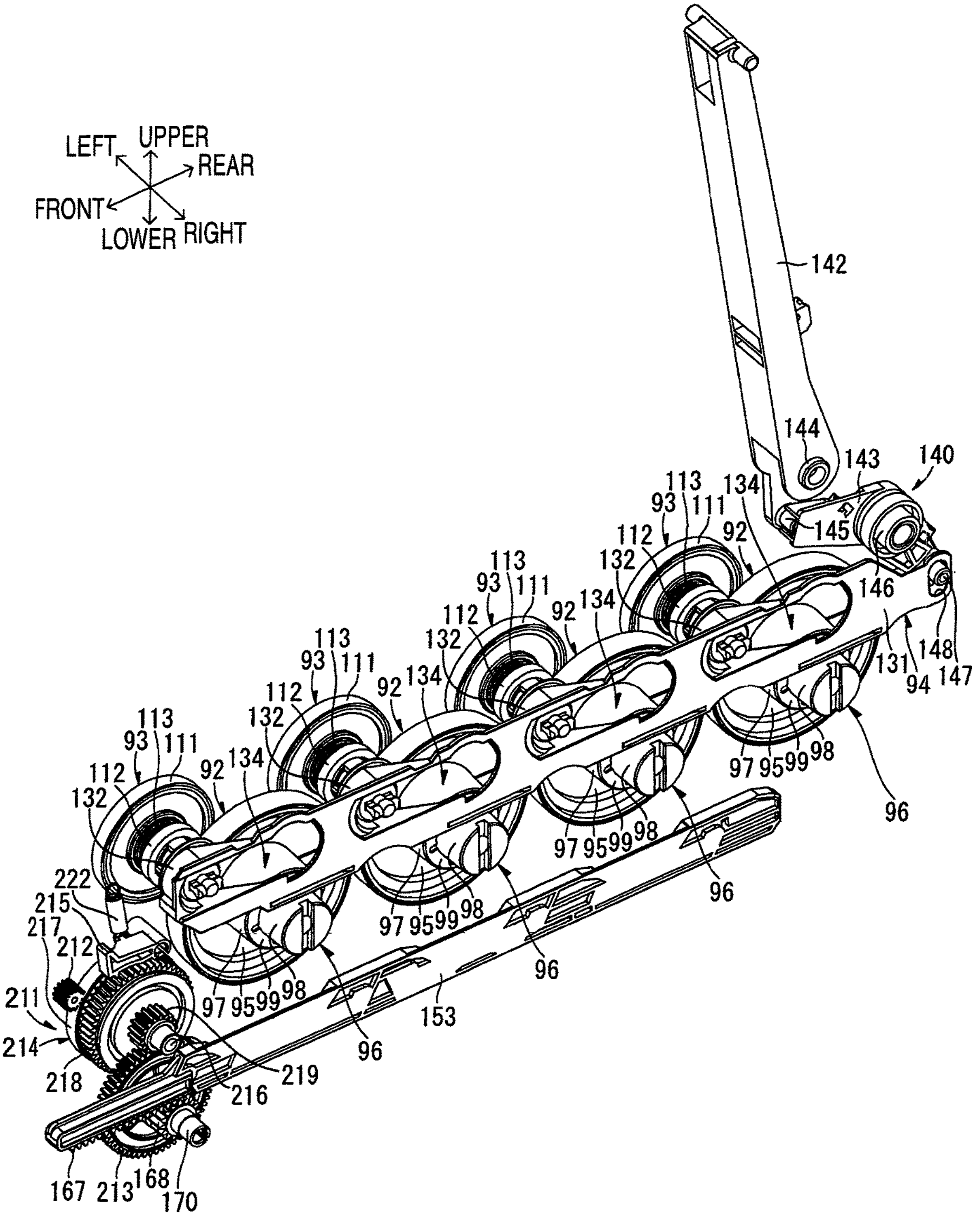
FIG. 13 is a perspective view of the driving force transmission mechanism and the first cover linkage mechanism of FIG. 8 as viewed from the right front direction, showing the state in which the top cover is opened.
Figure 14:
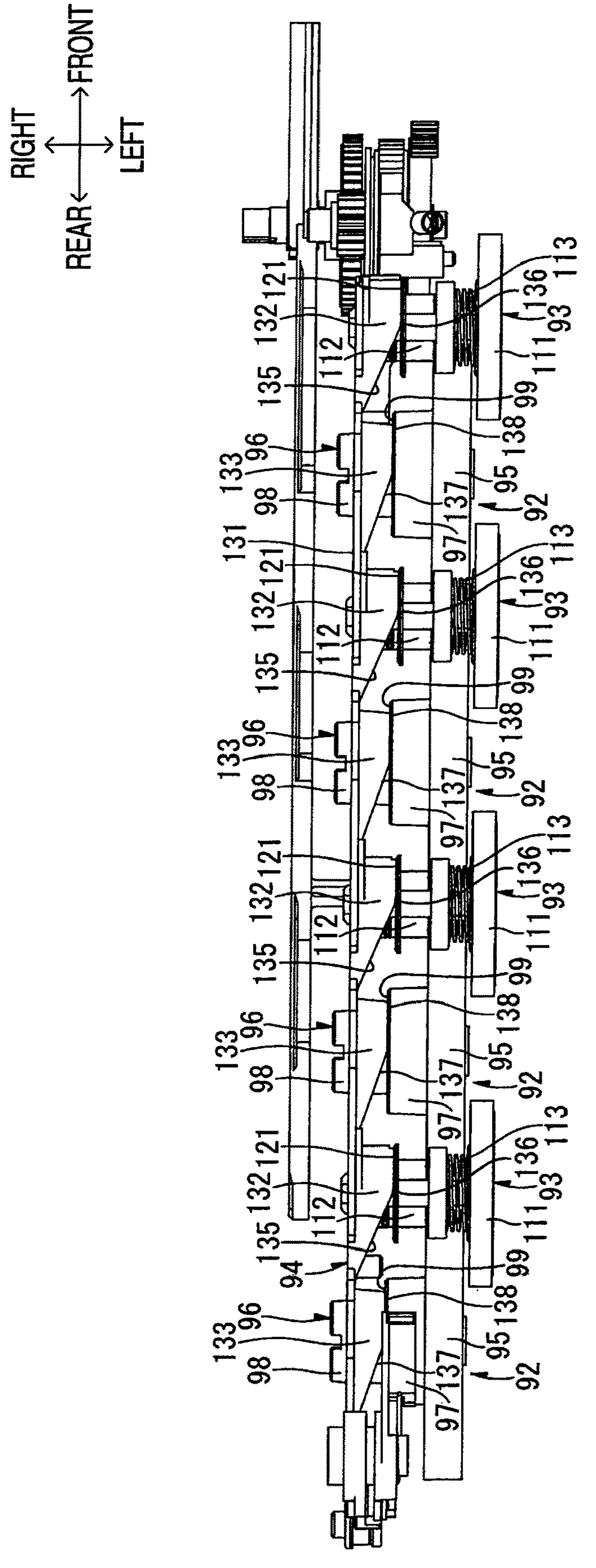
FIG. 14 is a plan view of the driving force transmission mechanism of FIG. 13, showing a state in which the top cover is opened.

FIG. 8 is a perspective view of a driving force transmission mechanism and a first cover linkage mechanism as viewed from a left front direction thereof. FIG. 9 is a left side view of the driving force transmission mechanism and the first cover linkage mechanism, showing a state in which the top cover is closed. FIG. 10 is a perspective view of the driving force transmission mechanism and the first cover linkage mechanism as viewed from a right front direction thereof, showing the state in which the top cover is closed. FIG. 11 is a plan view of the driving force transmission mechanism, showing a state in which a top cover is closed. FIG. 12 is a left side view of the driving force transmission mechanism and the first cover linkage mechanism, showing a state in which the top cover is opened. FIG. 13 is a perspective view of the driving force transmission mechanism and the first cover linkage mechanism as viewed from the right front direction thereof, showing a state in which the top cover is opened. FIG. 14 is a plan view of the driving force transmission mechanism, showing a state in which the top cover is opened.

Note that a connecting and disconnecting translation cam 153 as an example of a translation member and a connecting and disconnecting drive mechanism 211, which will both be described in detail later, are shown in the respective figures from FIG. 8 to FIG. 14. In addition, the process cartridges 3 and the top cover 4 are shown in FIG. 8.

(1) Drive Force Transmission Member

A driving force transmission mechanism 91 is provided on an outside of the left-hand body frame 62 (refer to FIG. 10) for transmitting a driving force to the process cartridges 3. Note that in FIG. 8, although the body frame 62 is disposed between the four process cartridges 3 and the driving force transmission mechanism 91, the illustration of the body frame 62 is omitted for the sake of simplifying the drawing.

As is shown in FIG. 10, the driving force transmission mechanism 91 includes four drum drive transmission members 92, four developing drive transmission members 93 and a driving translation cam 94.

(1-1) Drum Drive Transmission Members

The four drum drive transmission members 92 are provided in such a manner as to be associated with the four process cartridges 3. The drum drive transmission members 92 are disposed in positions that correspond to respective ones of the connecting members 47 (refer to FIG. 3) which are provided on the photosensitive drums 5 of their associated process cartridges 3 when the process cartridges 3 are brought into abutment with preventive members 191. The preventative members 191 will be described later.

Figure 15A:
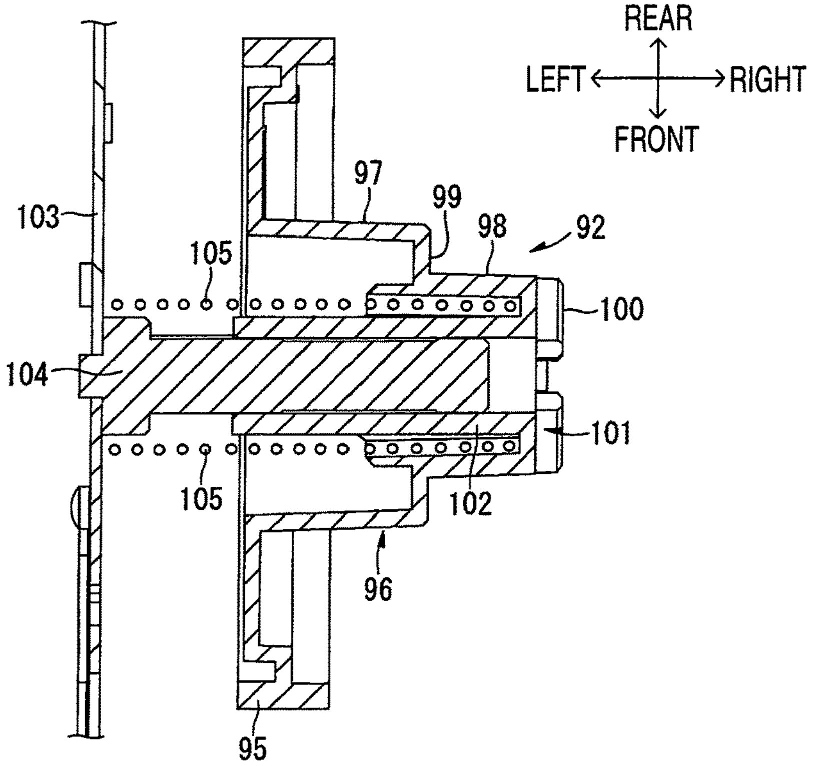
FIG. 15A is a sectional view of a drum drive transmission member of the driving force transmission mechanism of FIG. 8, showing the drum drive transmission member in an advanced position.
Figure 15B:
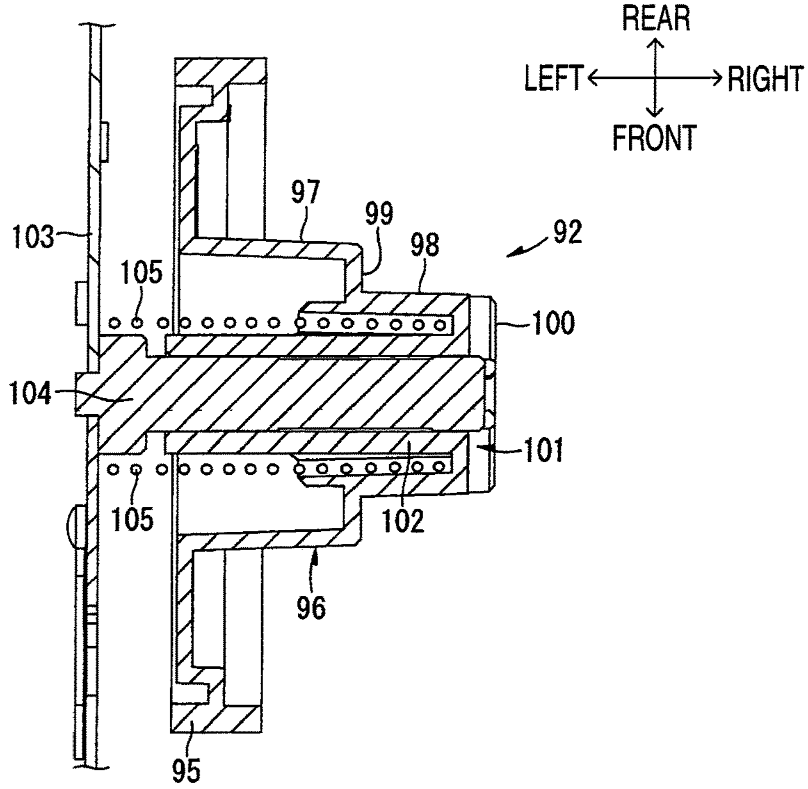
FIG. 15B is a sectional view of the drum drive transmission member of the driving force transmission mechanism of FIG. 8, showing the drum drive transmission member in a retreating position.

FIGS. 15A and 15B are sectional views of the drum drive transmission member 92.

The drum drive transmission member 92 includes integrally a gear part 95 and a raised part 96 which projects rightwards from a central portion of the gear part 95.

The gear part 95 has a substantially circular annular plate shape. A number of gear teeth into which driving force is inputted from a drum motor are formed on an outer circumferential surface of the gear part 95.

The raised part 96 has a cylindrical proximal end side outer circumferential surface 97 which has a center axis in common with the gear part 95. In addition, the raised part 96 has a cylindrical distal end side outer circumferential surface 98 which has a center axis in common with the gear part 95 to the right of the proximal end side outer circumferential surface 97. The distal end side outer circumferential surface 98 is formed to have a smaller diameter than that of the proximal end side outer circumferential surface 97. Furthermore, the raised part 96 has an annular rising surface 99 which is connected to a distal edge of the proximal end side outer circumferential surface 97 and a proximal edge of the distal end side circumferential surface 98 and an annular distal end face 100 which is connected to a distal edge of the distal end side outer circumferential surface 98. A linear engagement groove 101 (refer to FIG. 1) is formed on the distal end face 100 in such a manner as to be brought into engagement with the connecting member 47 (refer to FIG. 16) attached to an end face of the flange member 46. In addition, the raised part 96 includes integrally a cylindrical portion 102 which extends leftwards from a circumferential edge portion of an opening in the distal end face 100.

In addition, a holder 103 is attached to an external surface of the body frame 62 in such a manner as to cover the driving force transmission mechanism 91. Support shafts 104 are provided on the holder 103 in association with the respective drum drive transmission members 92 in such a manner as to project therefrom to extend rightwards. The support shaft 104 is inserted into the cylindrical portion 102 rotatably and slidably in the right-left direction. Thus, the drum drive transmission member 92 is supported rotatably about the support shaft 104 and is provided in such a manner as to move backwards and forwards in the right-left direction between an advanced position shown in FIG. 15A and a retreating position shown in FIG. 15B. In addition, as is shown in FIG. 8, one end of a coil spring 105 which is provided in such a manner as to be wound round a circumference of the cylindrical portion 102 is fixed to the drum drive transmission member 92. The other end of the coil spring 105 is fixed to the holder 103 (refer to FIG. 15A). The drum drive transmission member 92 is pressed rightwards by virtue of the pressing force (elastic force) of the coil spring 105.

Figure 16:
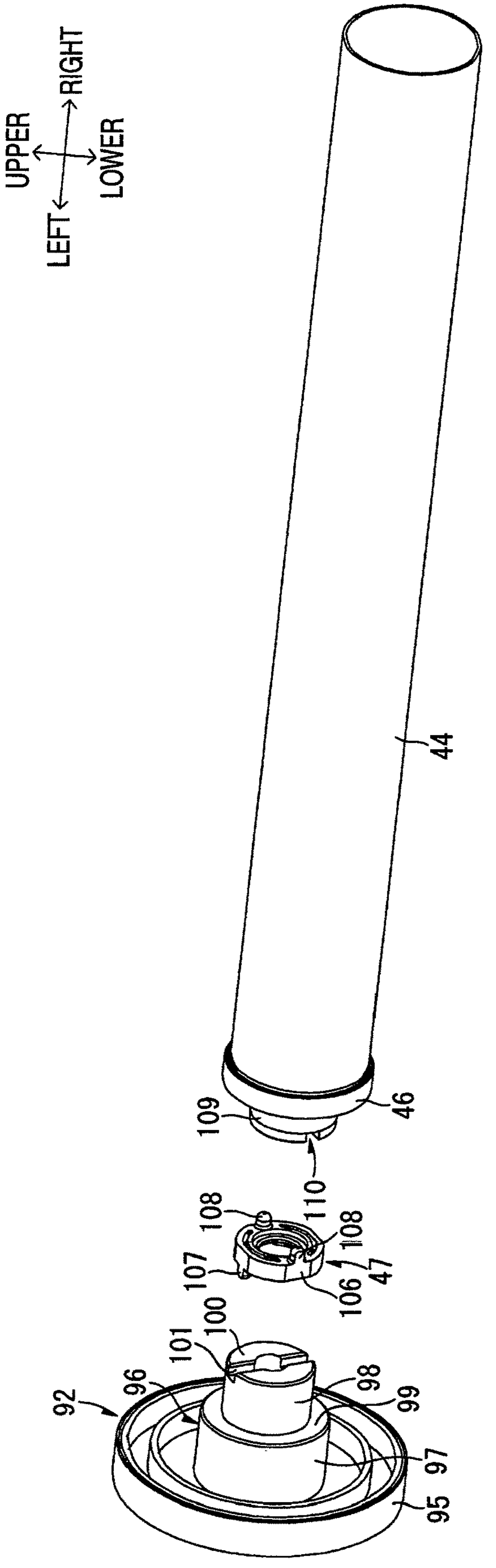
FIG. 16 is a perspective view of a drum main body, a flange member, a connecting member and the drum drive transmission member of the driving force transmission mechanism of FIG. 10.
Figure 17A:
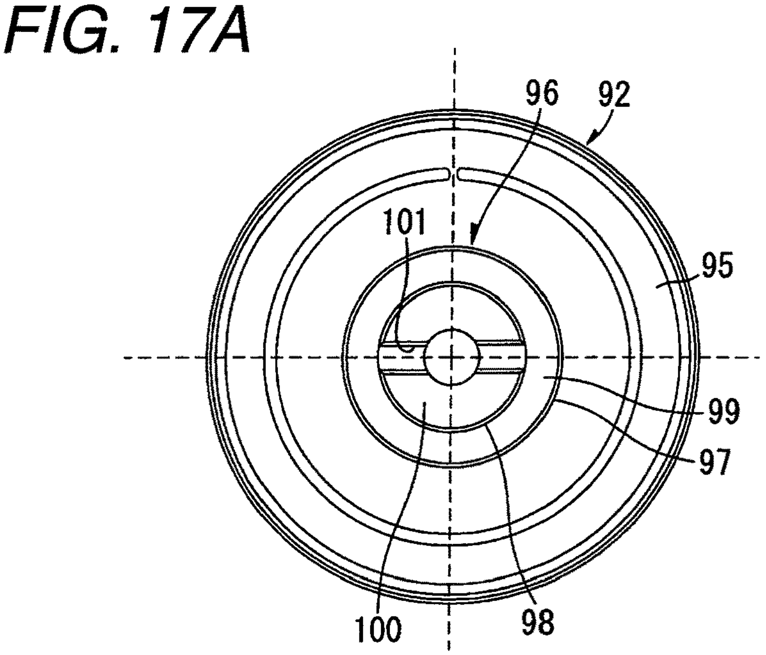
FIG. 17A is a right side view of the drum drive transmission member of FIG. 16.
Figure 17B:
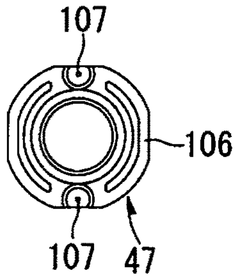
FIG. 17B is a left side view of the connecting member of FIG. 16.
Figure 17C:
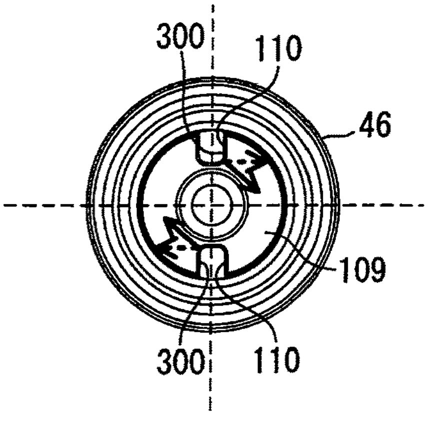
FIG. 17C is a left side view of the flange member of FIG. 16.

FIG. 16 is a perspective view of the drum main body, a flange member, a connecting member and the drum driving force transmission member. FIG. 17A is a right side view of the drum drive transmission member 92. FIG. 17B is a left side view of the connecting member. FIG. 17C is a left side view of the flange member.

As is shown in FIGS. 16 and 17A, an engagement groove 101 is formed on a straight line which passes through a center of the distal end face 100 of the drum drive transmission member 92.

As is shown in FIGS. 16 and 17B, the connecting member 47 includes integrally a flat cylindrical main body part 106, two first-side projections 107 which are provided on one end face of the main body part 106 in such a manner as to project therefrom and two second-side projections 108 which are provided on the other end face of the main body part 106. The first-side projections 107 are disposed in two positions which are point symmetrical (180 degrees rotationally symmetrical) with each other with respect to the center of the main body part 106. The second-side projections 108 are point symmetrical (180 degrees rotationally symmetrical) with each other with respect to the center of the main body part 106 and are disposed in two positions which shift 90 degrees about the center of the main body part 106 with respect to the first-side projections 107.

As is shown in FIG. 17C, a substantially cylindrical drum side engagement part 109 is formed on an end face of the flange member 46 in such a manner as to project leftwards. Recessed portions 110 are formed in two positions which are point symmetrical (180 degrees rotationally symmetrical) with each other with respect to the center of the drum side engagement part 109 (the flange member 46). In addition, the connecting member is connected to the drum side engagement part 109 (the end face of the flange member 46) in such a manner as to shift in position in a direction in which the second-side projections 108 confront each other by the second-side projections 108 of the connecting member 47 being fitted in the recessed portions 110, respectively.

In such a state that the drum drive transmission member 92 has advanced to the advanced position shown in FIG. 15A, the first-side projections 107 of the connecting member 47 fit in the engagement groove 101 of the drum drive transmission member 92, whereby a so-called Oldham coupling is made by the connecting member 47, the drum drive transmission member 92 and the drum side engagement part 109. Thus, even in the event that a slight shift in position is produced between a rotational center of the drum driving force transmission member and a rotational center of the flange member 46 (the photosensitive drum 5), the shift is permitted, and the rotation of the drum drive transmission member 92 is transmitted to the flange member 46.

(1-2) Developing Drive Transmission Members

As is shown in FIG. 8, the four developing drive transmission members 93 are provided in such a manner as to be associated with the respective process cartridges 3. The developing drive transmission members 93 are disposed in positions at which the developing drive transmission members 93 confront the developing roller drive gears 61 which are provided on their associated process cartridges 3 when a state results in which the process cartridges 3 are brought into abutment with the preventive members 191.

Figure 18A:
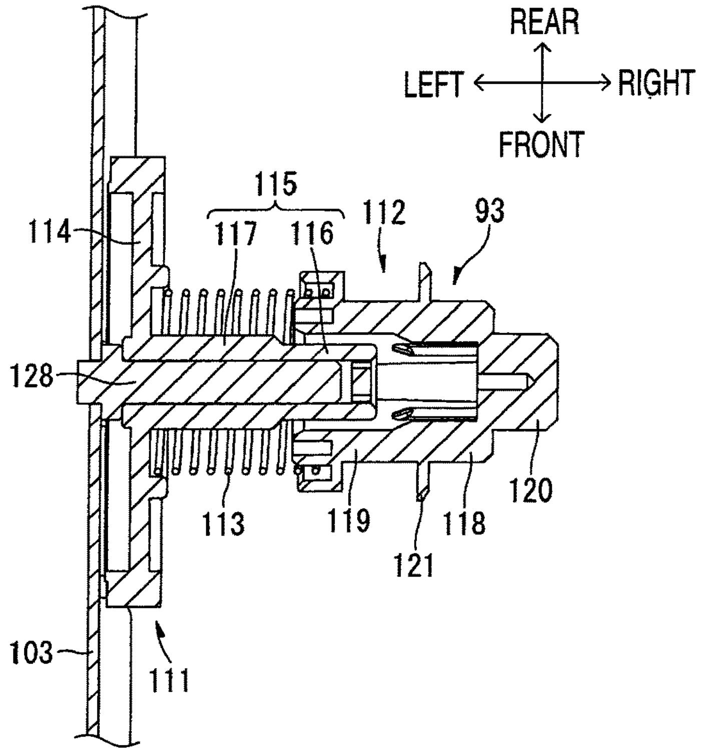
FIG. 18A is a sectional view of a developing drive transmission member of the driving force transmission mechanism of FIG. 8, when the developing drive transmission member is in an advanced position.
Figure 18B:
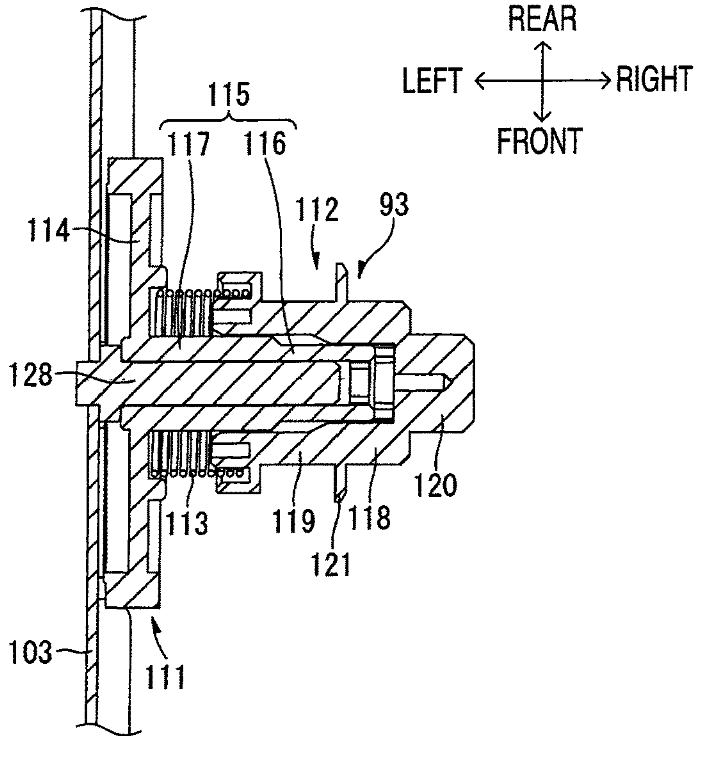
FIG. 18B is a sectional view of the developing drive transmission member of the driving force transmission mechanism of FIG. 8, when the developing drive transmission member is in a retreating position.

FIGS. 18A and 18B are sectional views of the developing drive transmission member 93.

As is shown in FIGS. 10, 18A and 18B, the developing drive transmission member 93 includes a developing drive gear 111, a reciprocating member 12 and a coil spring 113.

The developing drive gear 111 has integrally a substantially disc-shaped gear main body 114 and a substantially cylindrical guide core part 115 which projects rightwards from the gear main body 114.

A number of gear teeth into which driving force is inputted from a developing motor, not shown, are formed on an outer circumferential surface of the gear main body 114.

As is shown in FIGS. 18A and 18B, a guide core part 115 is formed in such a manner that a center axis thereof coincides with a center axis of the gear main body 114. The guide core part 115 has a distal end core portion 116 which has a relatively small first outside diameter at a distal end portion and a proximal end core portion 117 which has a relatively large second outside diameter at a proximal end portion thereof. An outer circumferential surface of the distal end core portion 116 and an outer circumferential surface of the proximal end core portion 117 are made to continue without difference in level by an inclined surface.

The reciprocating member 112 includes integrally a cylindrically shaped distal end cylindrical part 118 having a relatively small first inside diameter, a cylindrically shaped proximal end cylindrical part 119 which is provided adjacent to a left-hand side of the distal end cylindrical part 118 and which has a relatively large second inside diameter, an engagement part 120 which is provided adjacent to a right-hand side of the distal end cylindrical part 118, and a collar portion 121 which is made to project circumferentially from an outer circumferential surface of the distal end cylindrical part 118. The first inside diameter is substantially equal to or slightly larger than the first outside diameter of the distal end core portion 116. The second inside diameter is substantially equal to or slightly larger than the second outside diameter of the proximal end core portion 117. The guide core part 115 is inserted into the reciprocating member 112 from the left. The reciprocating member 112 can be made to move in the right-left direction with respect to the guide core part 115 to reciprocate or move backwards and forwards between an advanced position shown in FIG. 18A and a retreating position shown in FIG. 18B.

A coil spring 113 is provided in such a manner as to be wound round a circumference of the guide core part 115 and is disposed between the reciprocating member 112 and the gear main body 114. The reciprocating member 112 is pressed rightwards by virtue of the pressing force (elastic force) of the coil spring 113.

In addition, support shafts 128 are provided on the holder 113 in association with the respective developing drive transmission members 93 in such a manner as to project therefrom to extend rightwards. By this support shaft 128 being inserted into the guide core part 115 in such a manner as to rotate but not to slide, the developing drive gear 111 is supported in such a manner as to rotate about the support shaft 128 but not to slide.

Figure 19A:
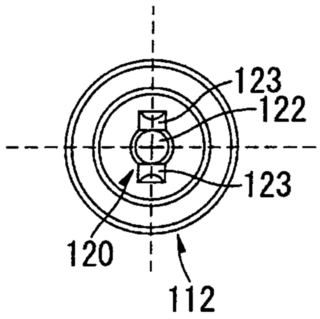
FIG. 19A is a right side view of a reciprocating member of the developing drive transmission member of FIG. 18A.

FIG. 19A is a right side view of the reciprocating member.

An engagement part 120 of the reciprocating member 112 includes integrally a substantially cylindrical center portion 122 which extends in the right-left direction and two abutment projecting portions 123 which are connected to a circumferential surface of the center portion 122. The two abutment projecting portions 123 are disposed on a straight line which passes through a center of the center portion 122 and are formed to have a 180-degree rotationally symmetrical shape.

Figure 19B:
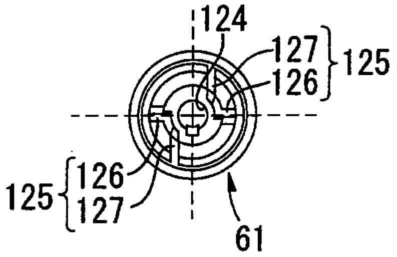
FIG. 19B is a left side view of a developing roller drive gear of the developing drive transmission member of FIG. 18A.

FIG. 19B is a left side view of the developing roller drive gear 61.

A circular recessed part 124 is formed on an external end face of the developing roller drive gear 61, and the circular recessed part 124 has a diameter which is substantially the same as an outside diameter of the center portion 122 of the engagement part 120. In addition, two abutment parts 125 are provided along a circumference of the recessed part 124 on the external end face of the developing roller drive gear 61. Each abutment part 125 has a substantially L-shape, as viewed from the side, which has a short piece portion 126 and a long piece portion 127 which intersects the short piece portion 126 at right angles. The short piece portion 126 of each abutment part 125 extends on a straight line which passes through a center of the recessed part 124. The long piece portion 127 of each abutment portion 125 extends along a straight line which passes through the center of the recessed part 124 and intersects a straight line which passes through the two short piece portions 126 at right angles while being spaced apart from the straight line. In addition, the two abutment parts 125 are 180 degrees rotationally symmetrical with each other with respect to the center of the recessed part 124.

In such a state that the reciprocating member 112 has advanced to the advanced position shown in FIG. 18A, the center portion 122 of the engagement part 120 fits in the recessed part 124 of the developing roller drive gear 61 and the abutment projecting portions 123 of the engagement part 120 are brought into abutment with the long piece portions 127 of the respective abutment parts 125 in a circumferential direction of the developing roller drive gear 61. Consequently, in this state, when a rotational force is inputted into the developing drive gear 111 and the reciprocating member 112 is caused to rotate together with the developing drive gear 111, the rotational force is transmitted from the respective abutment projecting portions 123 to the respective abutment parts 125, whereby the developing roller drive gear 61 rotates in the same direction as the reciprocating member 112.

Then, the distal end core portion 116 and the proximal end core portion 117 of the guide core part 115, as well as the distal end cylindrical part 118 and the proximal end cylindrical part 119 have dimensions in the right-left direction that satisfy the following two conditions (1) and (2).

Condition (1): In such a state that the reciprocating member 112 is positioned between the retreating position shown in FIG. 18B and a position where part of the respective abutment projecting portions 123 of the reciprocating member 112 are brought into abutment with the respective abutment parts 125 of the developing roller drive gear 61, the distal end core portion 116 of the guide core part 115 is disposed within the distal end cylindrical part 118 of the reciprocating member 112, and the proximal end core portion 117 of the guide core part 115 is disposed within the proximal end cylindrical part 119 of the reciprocating member 112.

Condition (2): In such a state that the reciprocating member 112 has advanced to the advanced position shown in FIG. 18A, the proximal end core portion 117 of the guide core part 115 is dislocated from the inside of the proximal end cylindrical part of the reciprocating member 112, and the distal end core portion 116 of the guide core part 115 is disposed in the inside of the proximal end cylindrical part 119 of the reciprocating member 112.

In such a state that the reciprocating member has advanced to the advanced position, a radial play of the reciprocating member relative to the guide core part 115 is increased by the operations described above. Thus, even though a shift in position is produced between a rotational center of the developing roller drive gear 61 and a rotational center of the developing drive transmission member 93 (the developing drive gear 111), in the event that the amount of shift between the rotational centers falls within a range of radial play of the reciprocating member 112 with respect to the guide core part 115, the shift is permitted, and the rotational force is transmitted well from the developing drive transmission member 93 to the developing roller drive gear 61.

(1-3) Driving Translation Cam

As is shown in FIGS. 10, 11, 13 and 14, the driving translation cam 94 is a member which is elongated in the front-rear direction and is attached to the body frame 62 (refer to FIG. 6) in such a manner as to reciprocate in a straight line in the front-rear direction. As is shown in FIGS. 11 and 14, the driving translation cam 94 includes a rectangular plate-shaped main body part 131 which is elongated in the front-rear direction, four first cam portions 132 which are formed integrally on the main body part 131 and four second cam portions 133 which are formed integrally on the main body part 131.

The main body part 131 is provided parallel to the body frame 62. Four holes 134 are formed in the main body part 131. The holes 134 are formed, respectively, in positions at which the holes 134 confront the four developing drive transmission members 93 in the right-left direction. Each hole 134 has an elongated hole shape which extends in the front-rear direction and has dimensions which permit vertical insertion and dislocation of the reciprocating member 112 of the developing drive transmission member 93. As is shown in FIG. 10, in such a state that the driving translation cam 94 is disposed in a relatively forward position, the developing drive transmission members 93 confront, respectively, rear end portions of the holes 134. On the other hand, as is shown in FIG. 13, in such a state that the driving translation cam 94 is disposed in a relatively rearward position, the developing drive transmission members 93 confront, respectively, front end portions of the holes 134.

The first cam parts 132 are provided on a left-hand surface (i.e., on a surface opposite to a surface which confronts the body frame 62) of the main body part 131 in such a manner as to be associated with the respective holes 134. The first cam part 132 has a substantially U-shape as viewed from the side which extends along substantially a front half of a circumferential edge of the hole 134. In addition, as is shown in FIG. 14, the first cam part 132 has an inclined portion 135 which is inclined in such a manner as to be spaced apart from the main body part 131 as the inclined portion 135 extends forwards and a flat portion 136 which extends from a front end of the inclined portion 135 in such a manner as to be in parallel with the main body part 131 and is, consequently, formed to have a substantially trapezoidal shape as viewed from the top.

The secondary cam parts 133 are provided at lower end portions of the left-hand surface of the main body part 131 in such a manner as to be associated with the respective drum drive transmission members 92. As is shown in FIGS. 11 and 14, each of the second cam parts 133 is formed at the rear of each of the first cam parts 132 in such a manner as not to overlap the first cam part 132 as viewed from the top. In addition, as is shown in FIG. 14, the second cam part 133 has an inclined portion 137 which is inclined in such a manner as to be spaced apart from the main body part 131 as the inclined portion 137 extends forwards and a flat portion 138 which extends from a front end of the inclined portion 137 in such a manner as to be in parallel with the main body part 131 and is, consequently, formed to have a substantially trapezoidal shape as viewed from the top.

In a state shown in FIGS. 10 and 11, the reciprocating members 112 of the respective developing drive transmission members 93 are inserted into the rear end portions of the holes 134, the color portion 121 is in abutment with the left-hand surface of the main body part 131 of the driving translation cam 94, and portions of the distal end cylindrical parts 18 and the engagement parts 120 project rightwards with respect to the main body part 131. The respective first cam parts 132 are disposed forwards of the main body part 131. In addition, the drum drive transmission members 92 are in abutment with the left-hand surface of the main body part 131 at the rising surfaces 99 thereof. The distal end portions (i.e., the portions where the distal end side outer circumferential surfaces 98 are formed) of the raised part 96 project rightwards relative to the main body part 131 below the main body part 131. The respective second cam parts 133 are disposed forwards of the respective drum drive transmission members 92. Namely, the respective drum drive transmission members 92 and the reciprocating members 112 of the developing drive transmission members 93 have both advanced to the advanced positions.

When the driving translation cam 94 is caused to move rearwards, the respective inclined portions 135 of the first cam parts 132 are brought into abutment with the respective collar portions 121 of the reciprocating members, and the inclined portions 137 of the second cam parts 133 are brought into abutment with the respective rising surfaces 99 of the drum drive transmission members 92. When the driving translation cam 94 moves further rearwards, the reciprocating members 112 and the first cam parts 132 move relatively in such a manner that the collar portions 121 of the reciprocating members 112 ride, respectively, on the inclined portions 135 of the first cam parts 132. Accordingly, the reciprocating members 112 receive a force in a leftward direction from the first cam parts 132 and are then caused to move leftwards against the pressing forces of the coil springs 113. In addition, the drum drive transmission members 92 and the second cam parts 133 move relatively in such a manner that the rising surfaces 99 of the drum drive transmission members 92 ride on the inclined portions 137 of the second cam parts 133. In conjunction with this, the second cam parts 133 receive a force in a leftward direction from the second cam parts 133 and are then caused to move leftwards against the pressing forces of the coil springs 105.

In addition, in a state shown in FIGS. 13 and 14, the reciprocating members 112 are brought into abutment with the flat portions 136 of the first cam parts 132 at the collar portions 121 thereof, and only the engagement parts 120 are inserted into the front end portions of the holes 134. In addition, the drum drive transmission members 92 are brought into abutment with the flat portions 138 of the second cam parts 133 at the rising surfaces 99 thereof, and the distal end portions of the raised parts 96 project slightly rightwards relative to the main body part 131. Namely, the drum drive transmission members 92 and the reciprocating members 112 of the developing drive transmission members 93 have retreated to the retreating positions.

(2) First Cover Linkage Mechanism

In addition, in the printer 1, the driving translation cam 94 is designed to move in association with the opening or closing of the top cover 4. Namely, the printer 1 includes a first cover linkage mechanism 140 for causing the driving translation cam 94 to move in a linked fashion with the opening or closing of the top cover 4 (see FIGS. 9 and 10).

As is shown in FIG. 8, the top cover 4 is provided in such a manner as to be opened and closed between a state in which a front end portion of the top cover 4 is lifted up from the body casing 2 (refer to FIG. 1) to open the upper surface of the body casing 2 and a state in which the top cover 4 extends along the upper surface of the body housing 2 to close the upper surface of the body housing 2 by a shaft, not shown, being inserted rotatably in substantially C-shaped rotation support parts 141 which are provided at a rear end portion of the top cover 4.

As is shown in FIG. 9, the first cover linkage mechanism 140 includes first cover link members 142 and second cover link members 143. The first cover link members 142 and the second cover link members 143 are provided in relation to the left- and right-hand body frames 62, 63 (refer to FIG. 6). Since the first cover link member 142 and the second cover link member 143 which are provided in relation to the left-hand body frame 62 and the first cover link member 142 and the second cover link member 143 which are provided in relation to the right-hand body frame 63 are configured laterally symmetrical, hereinafter, only the first cover link member 142 and the second cover link member 143 which are provided in relation to the left-hand body frame 62 will be described here.

As is shown in FIG. 10, the first cover link member 142 is formed into a long straight-line shape. One end portion of the first cover link member 142 is connected to an intermediate portion along the length of a left end portion of an inner surface of the top cover 4 in such a manner as to rotate about an axis extending along the right-left direction. The first cover link member 142 extends along the inner surface of the top cover 4 in the front-rear direction in such a state that the top cover 4 is closed. The other end portion 144 of the first cover link member 142 is connected to a rear end portion of the body frame 62 in such a manner as to rotate about an axis extending along the right-left direction. In addition, a connecting shaft 145 is formed at a rearmost end portion of the first cover link member 142 in such a manner as to project rightwards.

The second cover link member 143 is formed to have a V-shape as viewed from the side which opens at a relatively large angle (for example, an angle of about 135□). A support shaft 146 is formed at a bent portion of the second cover link member 143 in such a manner as to project rightwards. The second cover link member 143 is provided in such a manner as to rotate about the support shaft 146 by the support shaft 146 being supported rotatably at the rear end portion of the body frame 62. The connecting shaft 145 of the first cover link member 142 is inserted rotatably into one end portion of the second cover link member 143. A connecting shaft 147 is formed at the other end portion of the second cover link member 143 in such a manner as to project rightwards. An elongated hole 148 which is long in the vertical or up-down direction is formed at a rear end portion of the main body part 131 of the driving translation cam 94, and the connecting shaft 147 is inserted in the elongated hole 148 in such a manner as to be loosely fitted therein so as not only to rotate but also to move in the up-down direction.

When the top cover 4 is opened from the state in which the top cover 4 is closed (the closed state is shown in FIG. 10), the first cover link member 142 rotates about the other end portion 144 in such a manner as to be erected. In conjunction with the rotation of the first cover link 142, the one end portion of the second cover link member 143 is pushed forwards and the second cover link member 143 rotates about the support shaft 146, whereby the other end portion of the second cover link member 143 moves rearwards. In addition, by the other end portion of the second cover link member 143 moving rearwards, the driving translation cam 94 is pushed rearwards by the connecting shaft 147, whereby the driving translation cam 94 moves rearwards. Then, when a state results in which the top cover 4 is fully opened, the driving translation cam 94 is disposed in a rearmost position as is shown in FIG. 13.

When the top cover 4 is closed, the first cover link member 142 rotates about the other end portion of the first cover link member 142 in such a manner as to fall in an inclined fashion. The one end portion of the second cover link member 143 is pushed rearwards in conjunction with the rotation of the first cover link member 142, and the second cover link member 143 rotates about the support shaft 146, whereby the other end portion of the second cover link member 143 moves forwards. In addition, the driving translation cam 94 is pushed forwards by the connecting shaft 147 by the other end portion of the second cover link member 143 moving forwards, whereby the driving translation cam 94 moves forwards. Then, when a state results in which the top cover 4 is fully closed, the driving translation cam 94 is disposed in a relatively forward position as is shown in FIG. 10.

5. Locking Mechanism

Figure 20:
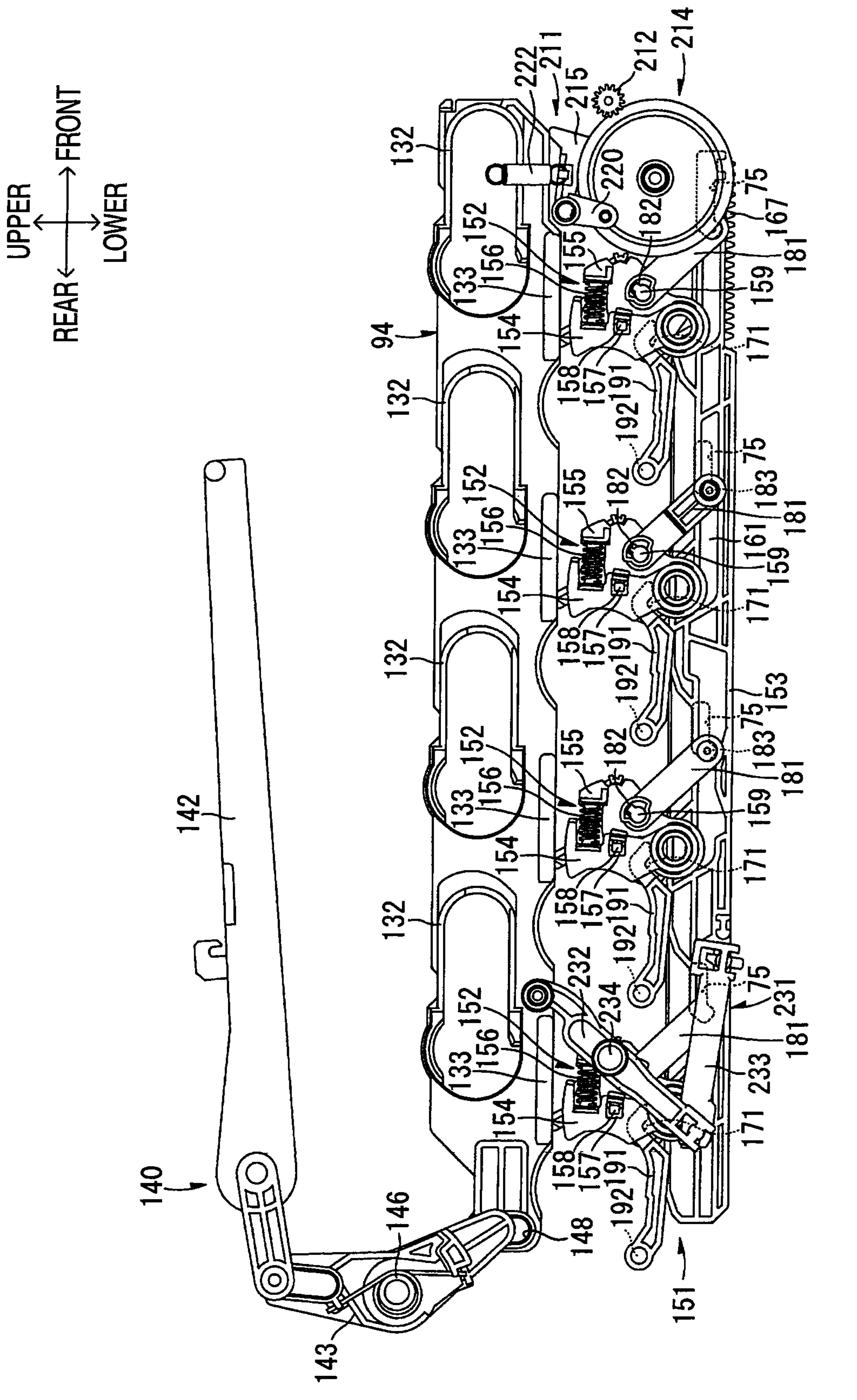
FIG. 20 is a left side view of a locking mechanism of the first cover linkage mechanism of FIG. 8, showing a state in which the top cover is closed.
Figure 21:
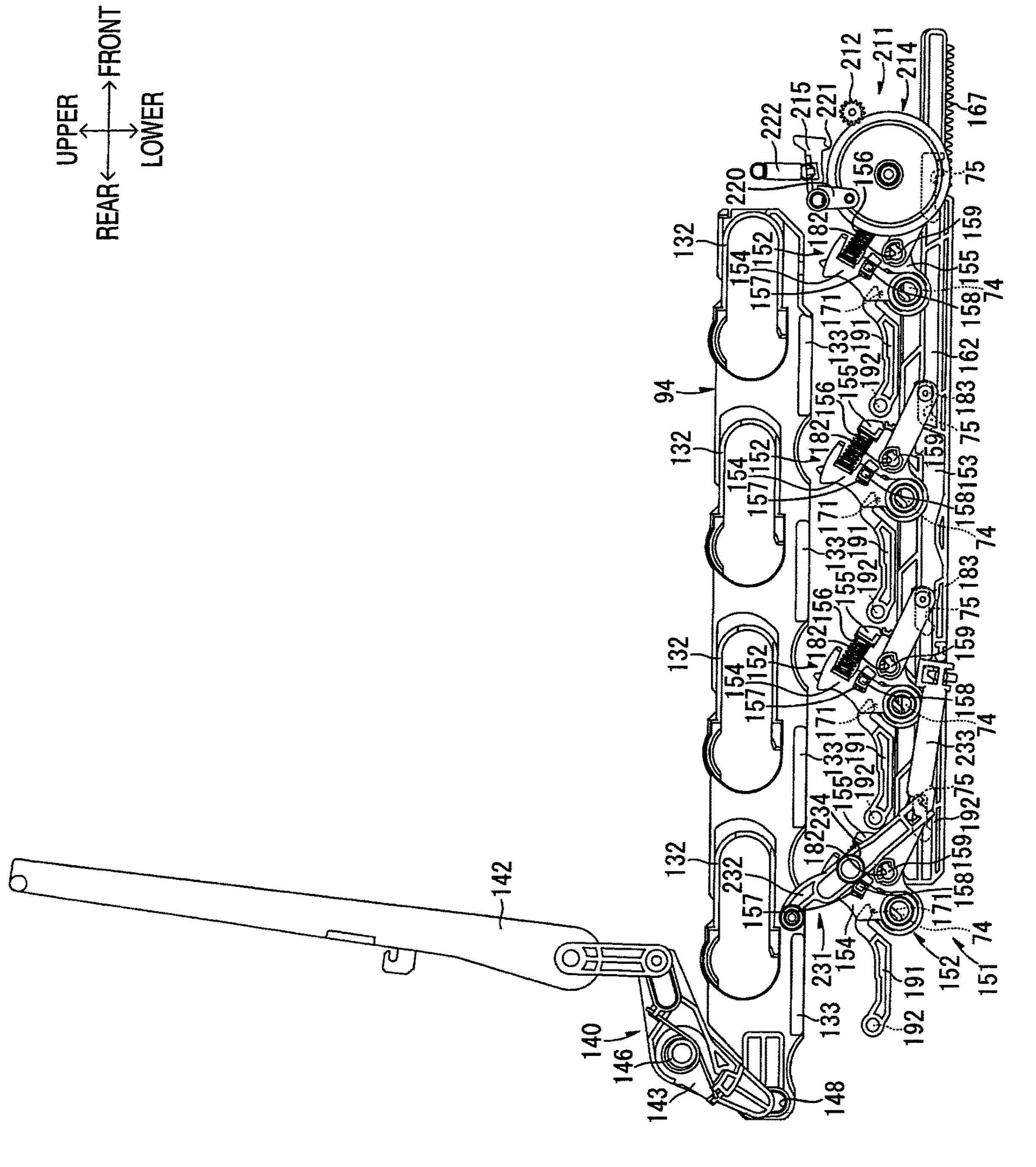
FIG. 21 is a left side view of the locking mechanism of the first cover linkage mechanism of FIG. 8, showing a state in which the top cover is opened.

FIG. 20 is a left side view of a locking mechanism, showing a state in which the top cover is closed. FIG. 21 is a left side view of the locking mechanism, showing a state in which the top cover is opened.

Note that the driving translation cam 94, the first cover linkage mechanism 140 and the preventive members 191, which will be described later, as well as a connecting-disconnecting drive mechanism 211 and a second cover linkage mechanism 231 are shown in FIGS. 20 and 21.

A locking mechanism 151 for locking the respective process cartridges 3 on to the body frames 62, 63 (refer to FIG. 6) is provided in the printer 1.

The locking mechanism 151 includes four left-hand fixing members 152, four right-hand fixing members 172 (refer to FIG. 22) and a left connecting and disconnecting translation cam 153 and a right connection and disconnecting translation cam 153.

(1) Left-hand Fixing Members

Four left-hand fixing members 152 are disposed on a left-hand side of the left-hand body frame 62. In addition, the four left-hand fixing members 152 are provided in such a manner as to be associated with a respective process cartridge 3. In such a state that the four process cartridges 3 are mounted in the body casing 2, the left-hand fixing members 152 are disposed forwards of the protecting portions 30 (refer to FIG. 3) of the respective process cartridges 3 (the drum cartridges 7). The left-hand fixing members 152 each include a lock lever 154, a pressing lever 155 and a coil spring 156.

The lock lever 154 is supported rotatably on the projecting portion 74 (refer to FIG. 7) which is formed on the left-hand body frame 62 at one end portion (i.e., a proximal end portion) thereof. A substantially rectangular hole 157 is formed at a central portion of the lock lever 154 in such a manner as to penetrate therethrough. A front edge of the other end portion (i.e., a distal end portion) of the lock lever 154 is formed to have a curved shape which corresponds to an external shape of the protecting portion 30 of the process cartridge 3. An operating portion 171 is formed on a right-hand surface of the lock lever 154 in a position which lies closer to the distal end portion than the hole 157 in such a manner as to project rightwards.

The pressing lever 155 is disposed forwards and to the right of the lock lever 154 and is supported rotatably on the projecting portion 74 (refer to FIG. 7) at one end portion (a proximal end portion) thereof. A hook portion 158 is formed at a central portion of the pressing lever 155 in such a manner as to project forwards and to be bent leftwards at a distal end portion thereof. The distal end portion of the hook portion 158 is inserted into the hole 157 of the lock lever 154 from the right. In addition, a connecting shaft 159 is formed at the central portion of the pressing lever 155 in such a manner as to project leftwards from a left-hand surface thereof. Furthermore, a support portion 160 (refer to FIG. 25) is formed at the central portion of the pressing lever 155 for supporting a spacing member 201, which will be described later. The support portion 160 projects rightwards from a right-hand surface of the pressing lever 155 and is inserted into the hole 187 (refer to FIG. 7), reaching a position lying on a right-hand side of the body frame 62 at a distal end thereof.

The coil spring 156 is interposed between the distal end portion of the lock lever 154 and the distal end portion of the pressing lever 155.

(2) Right-hand Fixing Members

Figure 22:
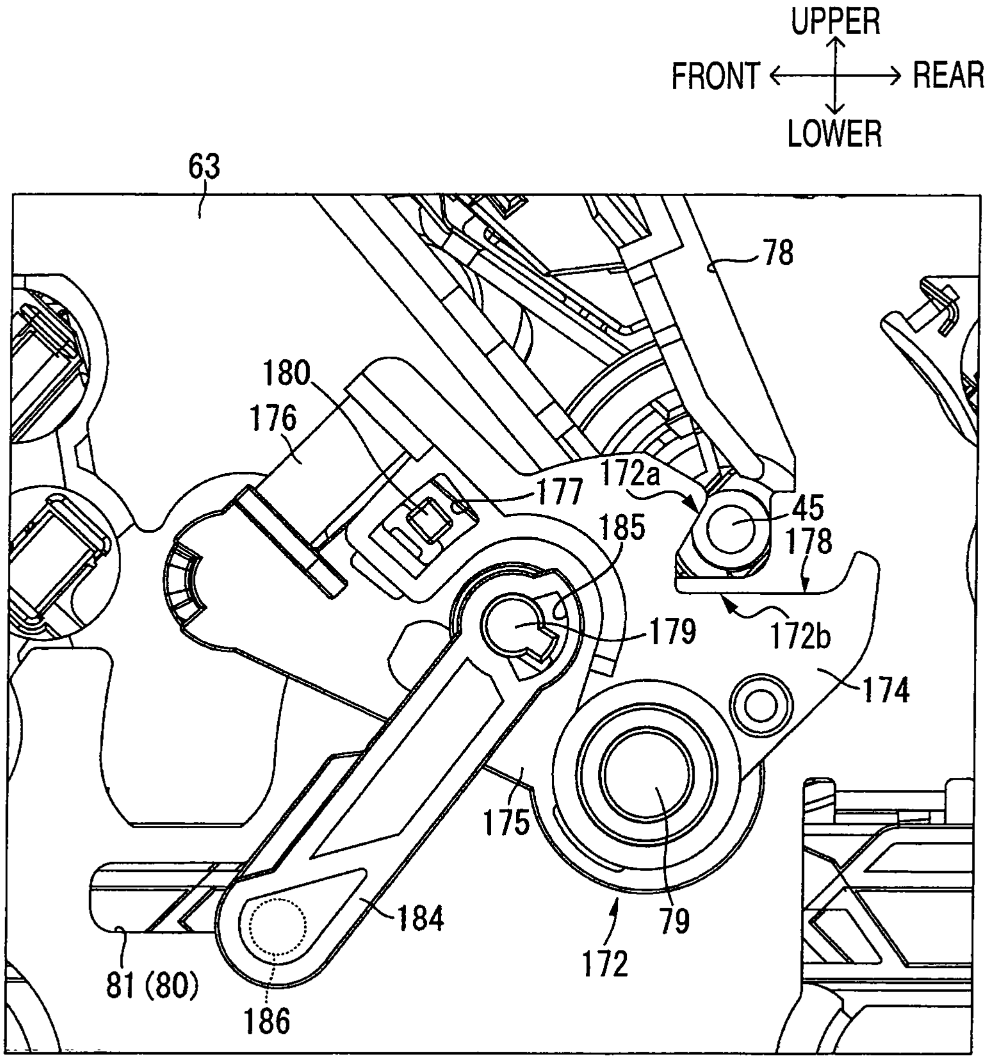
FIG. 22 is a right side view of part of a right-hand body frame of the body casing of FIG. 6, showing a state in which the top cover is closed.
Figure 23:
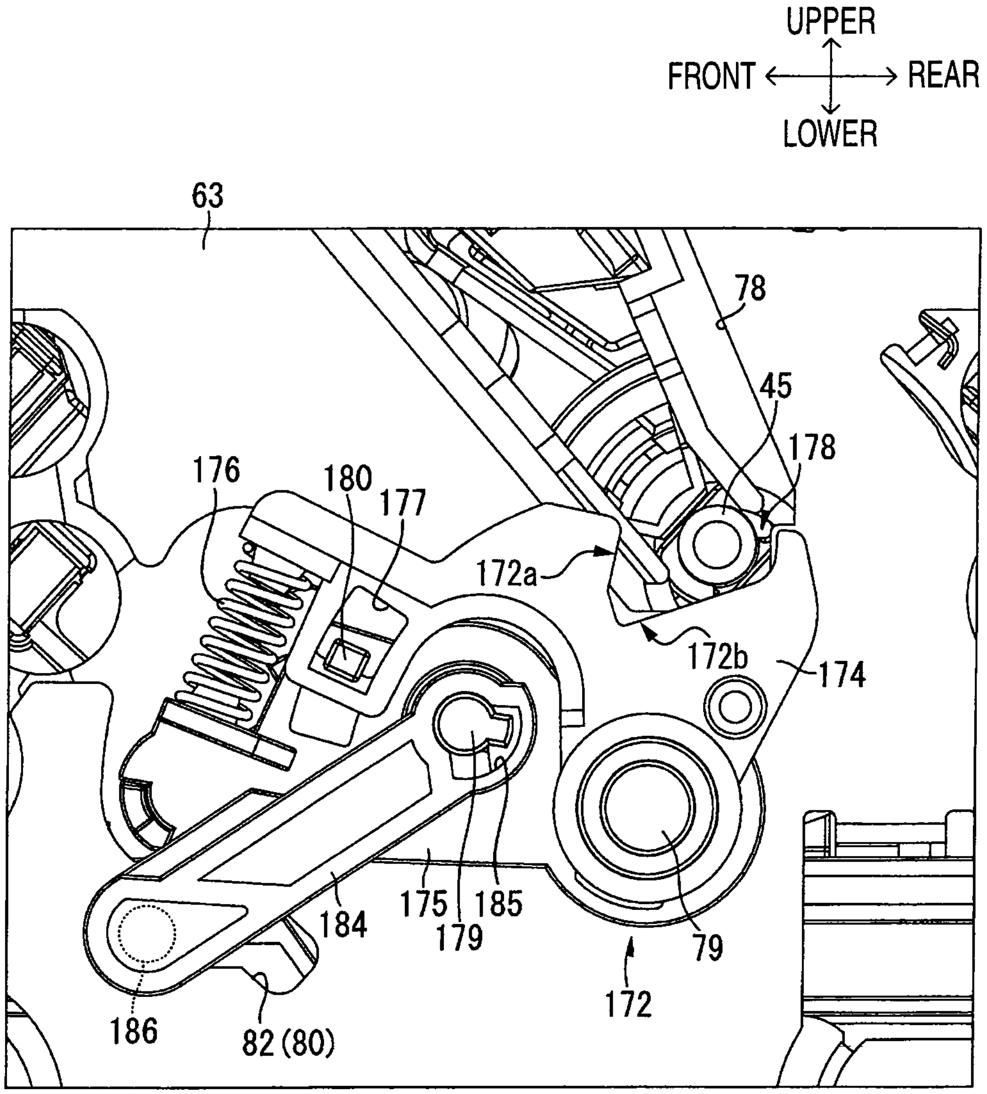
FIG. 23 is a right side view of part of the right-hand body frame of the body casing of FIG. 6, showing a state in which the top cover is opened.

FIG. 22 is a right side view of part of the right-hand body frame, showing a state in which the top cover is closed. FIG. 23 is a right side view of part of the right-hand body frame, showing a state in which the top cover is opened.

The four right-hand fixing members 172 are provided in such a manner as to be associated with the respective process cartridges 3 and are disposed on a right-hand side of the right-hand body frame 63. The right-hand fixing members 172 each include a lock lever 174, a pressing lever 175 and a coil spring 176.

The lock lever 174 is formed to have a substantially C-shape as viewed from the side. One end portion (a proximal end portion) of the lock lever 174 is supported rotatably on the projecting portion 79 formed on the right-hand body frame 63. A substantially rectangular hole 177 is formed in the other end portion (a distal end portion) of the lock lever 174 in such a manner as to penetrate therethrough. In addition, a cutout portion 178 is formed in the lock lever 174 between the proximal end portion and the distal end portion thereof in such a manner as to be cut out into a recess which is recessed downwards.

The pressing lever 175 is disposed forwards and to the left of the lock lever 174 and is supported rotatably on the projecting portion 79 at one end portion (a proximal end portion) thereof. A locking portion 180 is formed at a distal end portion of the pressing lever 175 in such a manner as to project rightwards. A distal end portion of the locking portion 180 is inserted into the hole 177 of the lock lever 174 from the left. In addition, a connecting shaft 179 is formed at a central portion of the pressing lever 175 in such a manner as to project rightwards from a right-hand surface thereof. Furthermore, although not shown, a support portion is formed at the central portion of the pressing lever 175 in such a manner as to project rightwards from the right-hand surface of the pressing lever 175, and the spacing member 201, which will be described later, is supported rotatably by the support portion.

The coil spring 176 is interposed between the distal end portion of the lock lever 174 and the distal end portion of the pressing lever 175.

(3) Connecting and Disconnecting Translation Cam

Figure 24:
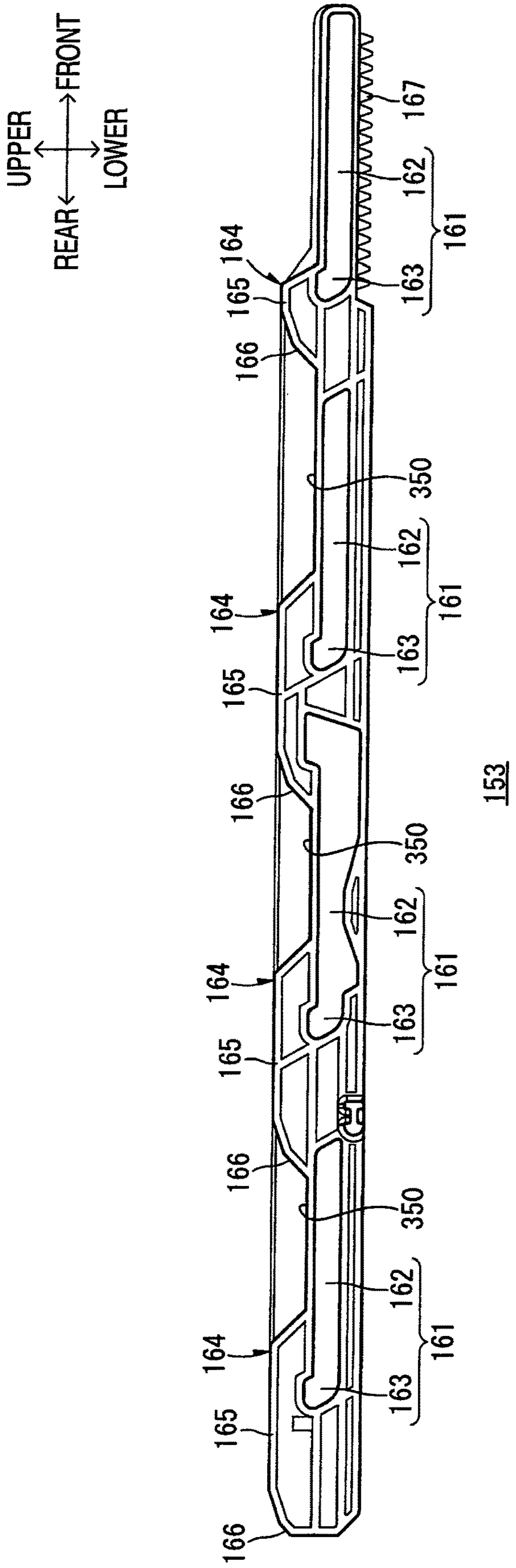
FIG. 24 is a left side view of a connecting and disconnecting translation cam of the body casing of FIG. 6.

FIG. 24 is a left side view of the connecting and disconnecting translation cam.

Since the left and right connecting and disconnecting translation cams 153 have configurations which are laterally symmetrical with each other, hereinafter, only the left-hand connecting and disconnecting translation cam 153 will be described.

The connecting and disconnecting translation cam 153 is a member which extends in the front-rear direction and is attached on an inner surface of the body frame 62 (refer to FIG. 6) in such a manner as to reciprocate in a straight line in the front-rear direction.

Four guide grooves 161 are formed on a left-hand surface of the connecting and disconnecting translation cam 153 in such a manner as to be associated with each connecting and disconnecting translation cam 153. The guide groove 161 has a linear groove portion 162 which extends in the front-rear direction and an intersecting groove portion 163 which extends obliquely upwards and rearwards from a rear end of the linear groove portion 162.

Four third cam portions 164 are formed on an upper surface of the connecting and disconnecting translation cam 153 at intervals in the front-rear direction. The four third cam portions 164 are each formed to have a substantially trapezoidal shape as viewed from the side which projects upwards from the upper surface 350 (i.e., a permissive surface) of the connecting and disconnecting translation cam 153 and each have a horizontal surface 165 (i.e., a spacing surface) which extends in the front-rear direction and an inclined surface 166 (i.e., a permissive surface) which continues to a rear end of the horizontal surface 165 and the upper surface of the connecting and disconnecting translation cam 153. An interval defined between the frontmost third cam portion 164 and the third cam portion 164 which lies adjacent thereto is made longer than intervals defined between the other adjacent third cam portions 164.

A rack gear 167 is formed on a lower surface of a front end portion of the connecting and disconnecting translation cam 153. As is shown in FIG. 10, a pinion gear 168 is made to mesh with the rack gear 167 on the left-hand connecting and disconnecting translation cam 153. As is shown in FIG. 8, a pinion gear 169 is made to mesh with a rack gear 167 on the right-hand connecting and disconnecting translation cam 153. The pinion gears 168, 169 are attached, respectively, to a left end portion and a right end portion of a connecting shaft 170 in such a manner as not to rotate. When the left-hand connecting and disconnecting translation cam 153 moves in the front-rear direction, the right-hand connecting and disconnecting translation cam 153 moves leftwards in synchronism with the movement of the left-hand connecting and disconnecting translation cam 153 in the same direction and by the same shifting amount of the left-hand connecting and disconnecting translation cam 153.

(4) Link Members

The respective left-hand fixing members 152 and the left-hand connecting and disconnecting translation cam 153 are connected to each other by link members 181 as is shown in FIGS. 20 and 21.

The connecting shaft 159 of the left-hand fixing member 152 is inserted into one end portion of the link member 181 in such a manner as to rotate within a predetermined angular range. Specifically, a substantially fan-shaped hole 182 is formed at the one end of the link member 181. The connecting shaft 159 has a key hole shape as viewed from the side which has a projection on a circumferential surface thereof. In addition, when the connecting shaft 159 is inserted into the hole 182, the link member 181 is made to rotate about the connecting shaft 159 within the angular range. On the other hand, a connecting shaft 183 is formed at the other end portion of the link member 181 in such a manner as to project rightwards. The connecting shaft 183 is inserted into the guide hole 75 of the body frame 62, and a distal end portion thereof is fitted in the guide groove 161.

The respective right-hand fixing members 172 and the right-hand connecting and disconnecting translation cam 153 are connected to each other by link members 184 as is shown in FIGS. 22 and 23.

The connecting shaft 179 of the right-hand fixing member 172 is inserted into one end portion of the link member 184 in such a manner as to rotate within an angular range. The angular range may be predetermined. Specifically, a substantially fan-shaped hole 185 is formed at the one end of the link member 184. The connecting shaft 179 has a key hole shape as viewed from the side which has a projection on a circumferential surface thereof. In addition, when the connecting shaft 179 is inserted into the hole 185, the link member 184 is made to rotate about the connecting shaft 179 within the angular range. On the other hand, a connecting shaft 186 is formed at the other end portion of the link member 184 in such a manner as to project leftwards. The connecting shaft 183 is inserted into the guide hole 80 of the body frame 63, and a distal end portion thereof is fitted in the guide groove 161.

6. Preventive Members

As is shown in FIGS. 20 and 21, four preventive members 191 are provided in the printer 1. The four preventive members 191 are disposed, respectively, on left-hand sides of the left-hand fixing members 152.

The preventive member 191 has an arm shape. An insertion hole 192 is formed at one end portion (i.e., a proximal end portion) of the preventive member 191. A clamping shaft 351 (refer to FIG. 7) which is provided on the body frame 62 (refer to FIG. 7) in a position which is forward of the lower end portion of the process cartridge guide groove 71 with a slight interval provided therebetween is inserted into the insertion hole 192. Thus, each preventive member 191 is supported rotatably about the insertion hole 192 (the clamping shaft 351) by the body frame 62. A distal end portion of the preventive member is brought into abutment with the operating portion 171 of the left-hand fixing member 152 (the lock lever 154) from thereabove and extends in the front-rear direction. The distal end portion of the preventive member 191 extends upwards and is then folded back to have a hook shape. Note that in the right-hand fixing member 172, the lock lever 174 corresponds to the preventive member 191 (refer to FIG. 23).

7. Spacing Members

Figure 25:
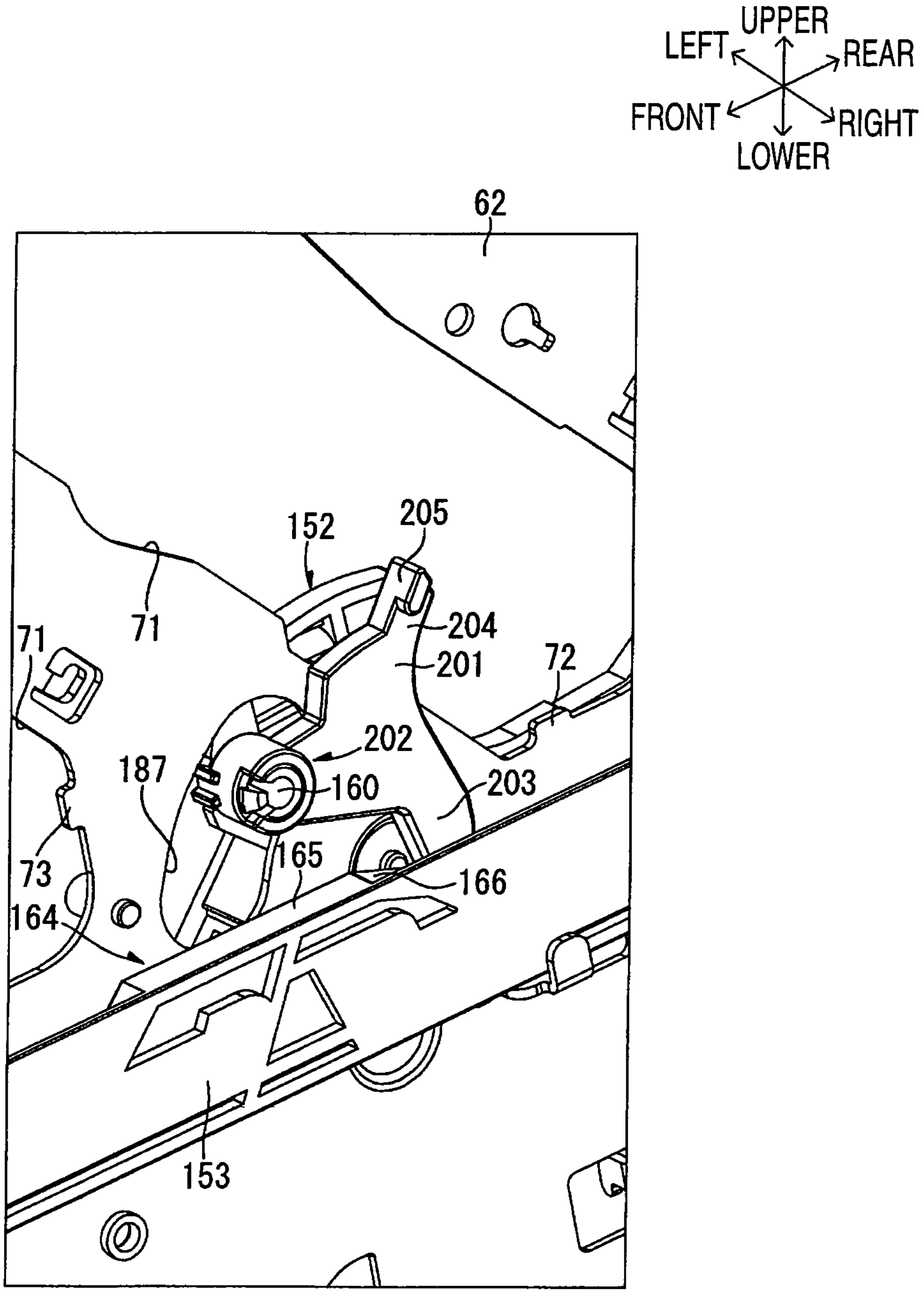
FIG. 25 is a right side view of a part of the left-hand body frame of the body casing of FIG. 6, showing a state in which the top cover is closed.
Figure 26:
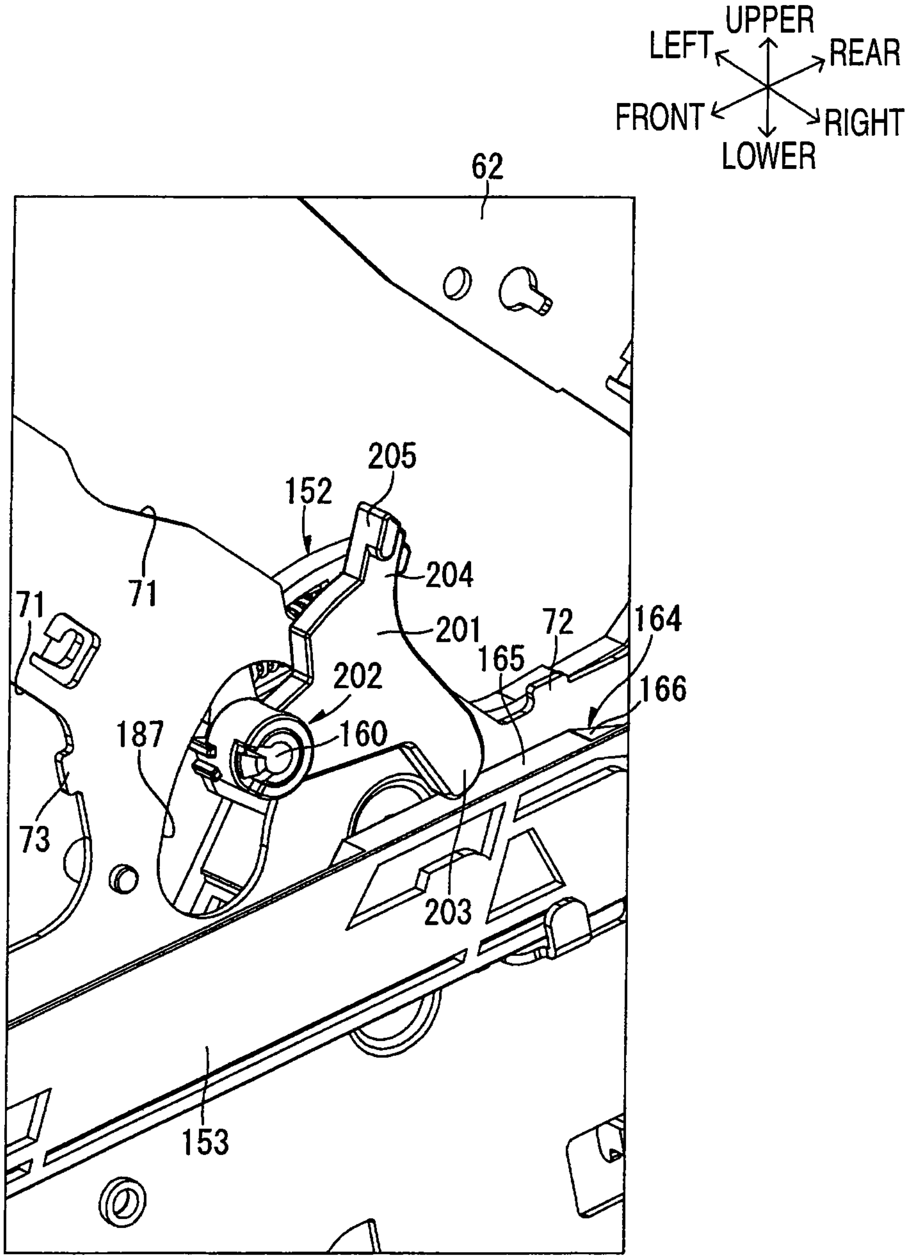
FIG. 26 is a right side view of the part of the left-hand body frame of the body casing of FIG. 6, showing a state in which the top cover is opened.

FIG. 25 is a right side view of part of the left-hand body frame, showing a state in which the top cover is closed. FIG. 26 is a right side view of the part of the left-hand body frame, showing a state in which the top cover is opened.

A plurality of spacing members 201 (e.g., eight spacing members 201 in this exemplary embodiment) are provided in the printer 1 in such a manner as to be associated with the four left-hand fixing members 152 and the four right-hand fixing members 172 (refer to FIG. 22). Since the spacing members 201, which are provided in such a manner as to be associated with the left-hand fixing members 152 and the spacing members 201 which are provided in such a manner as to be associated with the right-hand fixing members 172, are configured to be laterally symmetrical with each other, hereinafter, only the left-hand spacing members 201 will be described.

The four spacing members 201 are disposed on an inside (e.g., a right-hand side) of the left-hand body frame 62 in such a manner as to confront, respectively, their associated left-hand fixing members 152 in the right-left direction.

The spacing member 201 has a substantially triangular plate shape. The support portion 160 which is provided on the pressing lever 155 of the left-hand fixing member 152 is inserted in one angular portion 202 of the spacing member 201 in such a manner as to rotate relatively. Accordingly, the spacing member 201 is supported rotatably on the support portion 60.

The spacing member 201 is provided in such a manner as to extend rearwards from the support portion and is caused to rest on an upper surface of the connecting and disconnecting translation cam 153. A lower projecting portion 203 is formed at a rear end portion of the spacing member 201 in such a manner as to project downwards. The lower projecting portion 203 is brought into abutment with the upper surface of the connecting and disconnecting translation cam 153. In addition, an upper projecting portion 204 is formed at the rear end portion of the spacing member 201 in such a manner as to project upwards. A front surface of the upper projecting portion 204 is made to function as a pressing surface 205.

8. Connecting and Disconnecting Drive Mechanism

As is shown in FIGS. 9, 10, 12 and 13, a connecting and disconnecting drive mechanism 211 is provided in the printer 1 for reciprocating the connecting and disconnecting translation cam 153 in the front-rear direction.

The connecting and disconnecting drive mechanism 211 includes a motor gear 212 which rotates by virtue of driving force of a connecting and disconnecting motor 229 (refer to FIG. 27) as an example of a motor, an intermediate gear 213 which is provided integrally with the pinion gear 168 and is adapted to rotate together with the pinion gear 168, a planetary differential clutch 214 for engaging and disengaging the transmission of rotational force of the motor gear 212 to the intermediate gear 213, and a clutch engaging lever 215 for switching between engaging and disengaging the transmission of the rotational force by the planetary differential clutch 214.

As is shown in FIGS. 10 and 13, the planetary differential clutch 214 includes a shaft 216 which is held on the holder 103 (refer to FIG. 15A). An input gear 217, an engagement gear 218 and an output gear 219 are supported rotatably on the shaft 216. The motor gear 212 meshes with the input gear 217. The engagement gear 218 is disposed at a right-hand side of the input gear 217 and has on an outer circumferential surface thereof a number of teeth with which the clutch engaging lever 215 is brought into engagement. The output gear 219 is disposed at a right-hand side of the engagement gear 218. The output gear 219 has a smaller diameter than that of the input gear 217 and meshes with the intermediate gear 213.

The clutch engaging lever 215 is disposed in such a manner as to extend in the front-rear direction above the engagement gear 218. As is shown in FIGS. 9 and 12, the clutch engaging lever 215 is supported on a support member 220 which is attached to the holder 103 at a rear end portion thereof and is provided in such a manner as to swing about the support member 220. As is shown in FIG. 12, a claw 221 is formed on a lower surface of a distal end portion of the clutch engaging lever 215.

The other end of a coil spring 222 which is locked on the holder 103 at one end is locked on an intermediate portion of the clutch engaging lever 215. The clutch engaging lever 215 is pressed in such a manner that the distal end portion thereof is lifted upwards by the coil spring 222. In addition, in such a state that the driving translation cam 94 is disposed in a position shown in FIGS. 12 and 13, the distal end portion of the clutch engaging lever 215 is lifted upwards by virtue of the pressing force of the coil spring 222 and confronts a front end portion of the driving translation cam 94 with an interval provided forwards thereof. As is shown in FIGS. 9 and 10, when the driving translation cam 94 is caused to move to a frontmost position from the state described above, the driving translation cam 94 is brought into abutment with the clutch engaging lever 215 in the course of the movement, whereby the distal end portion of the clutch engaging lever 215 is pressed downwards against the pressing force of the coil spring 222 by the driving translation cam 94. As a result, the claw 221 of the clutch engaging lever 215 enters between the teeth of the engagement gear 218, whereby the clutch engaging lever 215 is brought into engagement with the engagement gear 218.

In such a state that the clutch engaging lever 215 is in engagement with the engagement gear 218, the engagement gear 218 is not allowed to rotate, and rotational force inputted into the input gear 217 from the motor gear 212 is transmitted to the output gear 219. Namely, the planetary differential clutch 214 engages the transmission of the rotational force of the motor gear 212 to the intermediate gear 213. Accordingly, the pinion gear 168 can be caused to rotate backwards and forwards together with the intermediate gear 213 by backward and forward rotations of the motor gear 212, whereby the connecting and disconnecting translation cam 153 can be caused to reciprocate in the front-rear direction.

On the other hand, in such a state that the clutch engaging lever 215 is not in engagement with the engagement gear 218, the rotational force that is inputted into the input gear 217 from the motor gear 212 is transmitted to the engagement gear 218 and is not transmitted to the output gear 219. Namely, the planetary differential clutch 214 disengages the transmission of the rotational force of the motor gear 212 to the intermediate gear 213. As this transition occurs, the output gear 219 is in such a state that the output gear 219 rotates freely, and hence, the connecting and disconnecting motor 229 (refer to FIG. 27) does not constitute a load to the movement of the connecting and disconnecting translation cam 153.

8. Second Cover Linkage Mechanism

In the printer 1, the driving translation cam 94 is made to move in a linked fashion with the opening or closing of the top cover 4, and the connecting and disconnecting translation cam 153 is made to move in a linked fashion with the movement of the driving translation cam 94. Namely, the printer 1 includes the second cover linkage mechanism 231 for causing the connecting and disconnecting translation cam 153 to move in parallel with the linked movement of the driving translation cam 94 with the opening or closing of the top cover by the first cover linkage mechanism 140.

The second cover linkage mechanism 231 includes a third cover link member 232 and a fourth cover link member 233.

The third cover link member 232 is a member which extends in a straight line, and a shaft 234 is formed at an intermediate portion thereof in such a manner as to project leftwards. The shaft 234 is supported rotatably on the holder 103 (refer to FIG. 15A). The other end portion (i.e., an end portion opposite to one end portion which is connected to the driving translation cam 94) of the third cover link member 232 and a rear end portion of the fourth cover link member 233 are connected together in such a manner as to rotate about an axis which extends in the right-left direction.

The fourth cover link member 233 is a member which extends in a straight line and is fixed to a left-hand surface of the connecting and disconnecting translation cam 153 with a posture in which it extends substantially in the front-rear direction. The other end portion (i.e., an end portion opposite to the one end portion which is connected to the driving translation cam 94) of the third cover link member 232 and a rear end portion of the fourth cover link member 233 are connected to each other in such a manner as to rotate about an axis extending along the right-left direction.

In such a state that the top cover 4 is closed, as is shown in FIG. 20, the driving translation cam 94 is disposed in a relatively forward position, while the connecting and disconnecting translation cam 153 is disposed in a rearmost position. Accordingly, the one end portion of the third cover link member 232 is positioned further forwards than the rear end portion of the fourth cover link member 233, and the third cover link member 232 and the fourth cover link member 233 form an acute angle therebetween. When the top cover 4 is opened and the driving translation cam 94 is caused to move rearwards, the one end portion of the third cover link member 232 moves rearwards, and the third cover link member 232 rotates about the shaft 234. In conjunction with the rotation of the third cover link member 232, the fourth cover link member 233 is pushed forwards by the other end portion of the third cover link member 232, whereby the connecting and disconnecting translation cam 153 is caused to move forwards. In addition, when a state results in which the top cover is fully opened, as is shown in FIG. 21, the connecting and disconnecting translation cam 153 is disposed in a frontmost position.

In the course of the opening of the top cover 4, by the rearward movement of the driving translation cam 94, the driving translation cam 94 is disconnected from the clutch engaging lever 215. Then, the distal end portion of the clutch engaging lever 215 is lifted upwards, whereby the engagement of the clutch engaging lever 215 with the engagement gear 218 is released. Accordingly, the connecting and disconnecting motor 229 (refer to FIG. 27) does not constitute the load to the movement of the connecting and disconnecting translation cam 153, whereby a smooth movement of the connecting and disconnecting translation cam 153 is attained.

In such a state that the top cover 4 is fully opened, as is shown in FIG. 21, the one end portion of the third cover link member 232 is positioned further rearwards than the rear end portion of the fourth cover link member 233, and the third cover link member 232 and the fourth cover link member 233 form an obtuse angle therebetween. When the top cover 4 is closed and the driving translation cam 94 moves forwards, the one end portion of the third cover link member 232 moves forwards, and the third cover link member 232 rotates about the shaft 234. In conjunction with the rotation of the third cover link member 232, the fourth cover link member 233 is pulled rearwards by the other end portion of the third cover link 232, whereby the connecting and disconnecting translation cam 153 moves rearwards. In addition, when a state results in which the top cover 4 is fully closed, as is shown in FIG. 20, the connecting and disconnecting translation cam 153 is disposed in a relatively rearward position.

9. Operations of Lock Mechanism (Left-hand Fixing Members and Right-hand Fixing Members) and Preventive Members in Conjunction with Opening or Closing of Top Cover In such a state that the top cover 4 is opened, as is shown in FIG. 21, the respective connecting shafts 183 of the left-hand link members 181 are inserted into the linear hole portions 76 (refer to FIG. 7) of the guide holes 75 of the body frame 62, and the distal end portions of the connecting shafts 183 are fitted in the intersecting groove portions 163 (refer to FIG. 24) of the guide grooves 161. In addition, as is shown in FIG. 23, the connecting shaft 183 of each right-hand link member 184 is inserted into the linear hole portion 81 (refer to FIG. 22) of the guide hole 80 of the body frame 63 and the distal end portion of the connecting shaft 183 is fitted in the intersecting groove portion 163 of the guide groove 161. In addition, as is shown in FIG. 21, the left-hand fixing members 152 fall in an inclined fashion and retreat from mounting/dismounting paths of the process cartridges 3 to thereby be positioned at positions at which the left-hand fixing members 152 do not confront the process cartridge guide grooves 71 (refer to FIG. 7) in the right-left direction. In addition, the respective preventive members 191 are brought into abutment with the operating portions 171 at a distalmost end portions of the preventative members 191 and are positioned at positions at which the preventative members 191 confront the lower end portions of the process cartridge guide grooves 71 in the right-left direction (i.e., preventive positions). Each respective right-hand fixing member 172 is, as is shown in FIG. 23, located in a position where the cutout portion 178 of the lock lever 174 confronts the lower end portion of the process cartridge guide groove 78 in the right-left direction and a bottom surface of the cutout portion 178 intersects a direction which extends along the process cartridge guide groove 78 at substantially right angles (i.e., a preventive position).

Thus, the process cartridges 3 can be mounted in or dismounted from the interior of the body casing 2. When mounting the process cartridges 3, the protecting portions 30 (refer to FIG. 3) of the process cartridges 3 (i.e., the drum cartridges 7) are fitted in the process cartridge guide grooves 71, while the right end portions of the drum shafts 45 are fitted in the process cartridge guide grooves 78, and the process cartridges 3 are caused to move obliquely downwards and rearwards, whereby the process cartridges 3 are gradually mounted into the interior of the body casing 2 while the protecting portions 30 and the drum shafts 45 are being guided by the process cartridge guide grooves 71, 78, respectively. In addition, when dismounting the process cartridges 3 from the body casing 2, the process cartridges 3 are gradually pulled obliquely upwards and forwards while the protecting portions 30 and the drum shafts 45 are being guided by the process cartridge guide grooves 71, 78, respectively.

In such a state that the top cover 4 is opened, since the preventive members 191 confront the lower end portions of the process cartridge guide grooves 71 in the right-left direction and the cutout portions 178 of the lock levers 174 confront the lower end portions of the process cartridge guide grooves 78 in the right-left direction, when the process cartridges 3 are mounted in the interior of the body casing 2, the protecting portions 30 are brought into abutment with the preventive members 191 or the drum shafts 45 are brought into abutment with the lock levers 174, whereupon the movement of the process cartridges 3 is prevented. Namely, the mounting of the process cartridges 3 into the body casing 2 is prevented at a point in time when the protecting portions 30 are brought into abutment with the preventive members 191 or the drum shafts 45 are brought into abutment with the lock levers 174.

Then, when the top cover 4 is closed, the driving translation cam 94 moves forwards, while the connecting and disconnecting translation cam 153 moves rearwards. As is shown in FIG. 21, the distal end portions of the respective connecting shafts 183 of the left-hand link members 181 are fitted in the intersecting groove portions 163 (refer to FIG. 24) of the guide grooves 161. Accordingly, when the connecting and disconnecting translation cam 153 moves rearwards, the distal end portions of the connecting shafts 183 move to the rear along the linear hole portions 76 (refer to FIG. 7) on the body frame 62 while kept fitted in the intersecting groove portions 163. Thus, the respective link members 181 rotate in such a manner that the one end portions thereof are lifted up, and the respective left-hand fixing members 152 rotate rearwards about the projecting portions 74 (refer to FIG. 7) which are formed on the body frame 62 in conjunction with the rotations of the link members 181. As a result, the respective left-hand fixing members 152 are put in the locked state and are disposed on the mounting/dismounting paths of the process cartridges and the front ends of the distal end portions of the lock levers 154 are brought into abutment with the protecting portions 30 of the process cartridges 3, whereby the protecting portions 30 are pressed obliquely downwards and rearwards.

In addition, as is shown in FIG. 20, the operating portions 171 move rearwards relative to the respective preventing members 191 in conjunction with the rotations of the respective left-hand fixing members 152, and the respective preventive members 191 rotate in such a manner that their distal end portions are lowered to move to positions where the operating portions 171 is brought into abutment with the bent portions at the distal end portions. As a result, the process cartridges 3 move downwards and as is indicated by a broken line in FIG. 7, the protecting portions 30 are brought into the abutment portions 72, 73, whereby the process cartridges 3 are fixed in place in the positions.

On the other hand, the distal end portions of the respective connecting shafts 186 of the right-hand link members 184 are fitted in the intersecting groove portions 163. Accordingly, when the connecting and disconnecting translation cam 153 moves rearwards, the distal end portions of the connecting shafts 186 move to the rear along the linear hole portions 81 (refer to FIG. 22) of the guide holes 80 on the body frame 63 while kept fitted in the intersecting holes 163. Thus, the respective link members 184 rotate in such a manner that the one end portions thereof are lifted upwards, and the respective right-hand fixing members 172 rotate to the rear about the projecting portions 79 (refer to FIG. 23) which are formed on the body frame 63 in conjunction with the rotation of the link members 184. As a result, as is shown in FIG. 22, the respective right-hand fixing members 172 are put in the locked state, whereby the front end portions of the cutout portions 178 of the lock levers 174 are brought into abutment with the drum shafts 45, respectively, and the drum shafts 145 are pressed obliquely downwards and rearwards. Accordingly, the photosensitive drums 5 are fixed in place at the left- and right-hand sides thereof.

In addition, in the course of the top cover 4 being closed, the driving translation cam 94 is brought into contact with the clutch engaging lever 215, and the distal end portion of the clutch engaging lever 215 is pushed downwards by the driving translation cam 94, whereby the clutch engaging lever 215 is brought into engagement with the engagement gear 218. Accordingly, after the top cover 4 has been closed, the connecting and disconnecting translation cam 153 can be caused to move by virtue of the driving force of the connecting and disconnecting motor 229 (refer to FIG. 27).

In addition, in the course of the top cover 4 being closed, when the driving translation cam 94 moves forward, the respective drum drive transmission members 92 and the reciprocating members 112 of the respective developing drive transmission members 93 advance to the advanced positions. The drum drive transmission members 92 are connected, respectively, to the connecting members 47, and the reciprocating members 112 are connected, respectively, to the developing roller drive gears 61. As a result, the photosensitive drums 5 and the developing rollers 8 are allowed to be driven to rotate.

When the top cover 4 is opened from the closed state, the respective members and portions of the printer 1 perform opposite operations to the operations performed when the top cover is closed. In addition, the left-hand fixing members 152 and the right-hand fixing members 172 are put in the unlocked state where the process cartridges 3 are not fixed.

Figure 27:
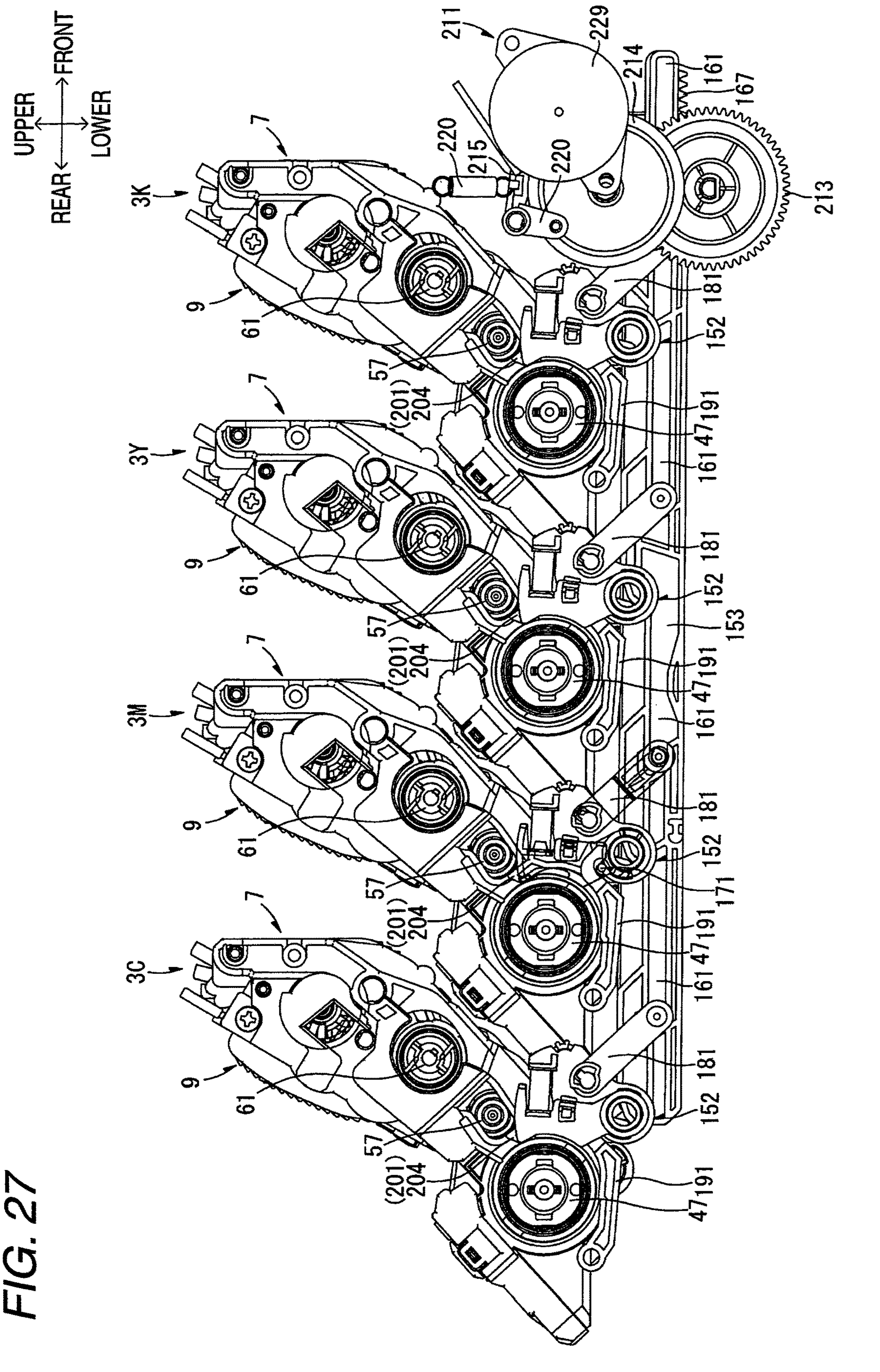
FIG. 27 is a left side view of the process cartridge, the locking mechanism, and a connecting and disconnecting mechanism of the image forming apparatus of FIG. 1, showing a state in which all developing rollers are in contact with photosensitive drums.
Figure 28:
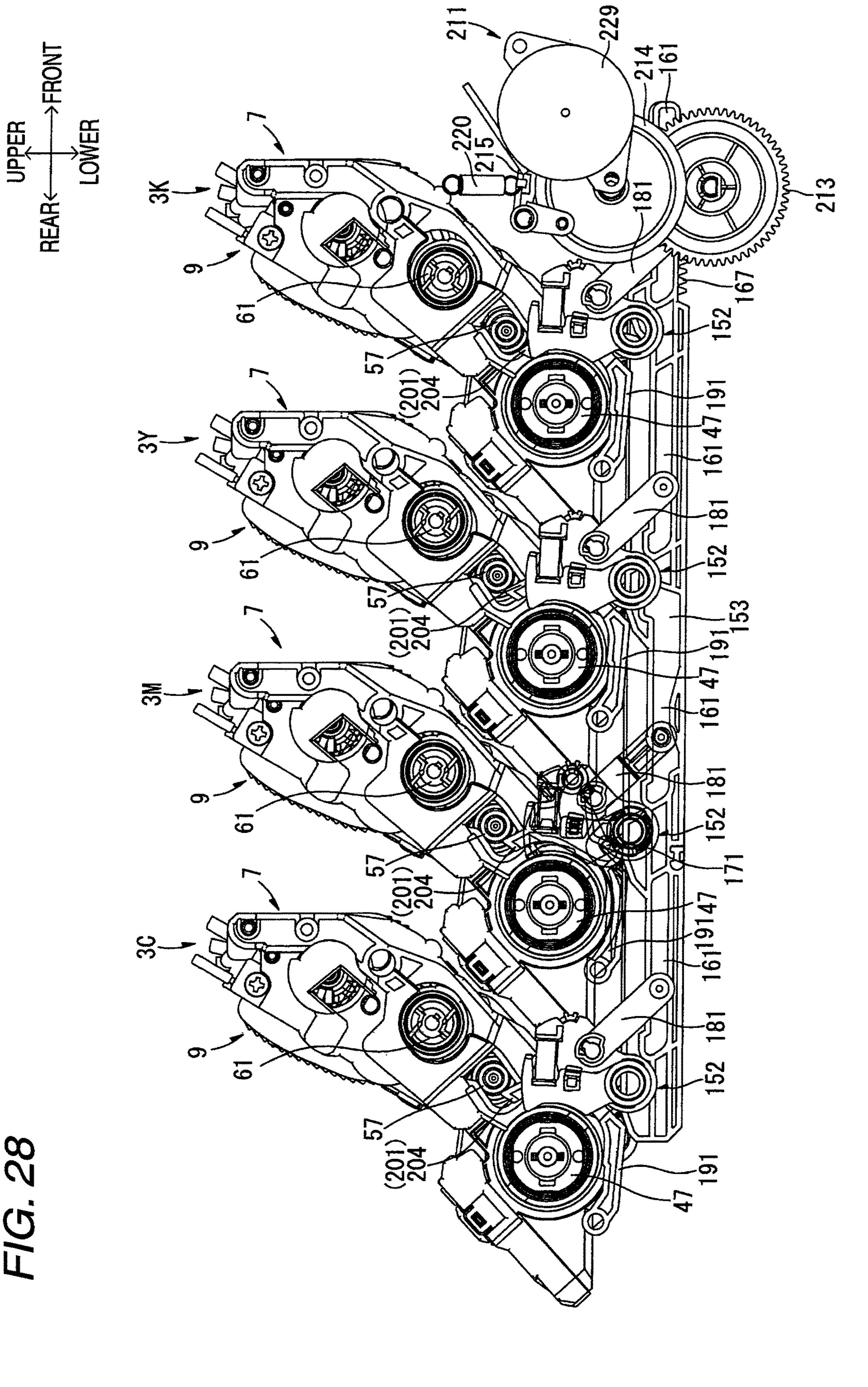
FIG. 28 is a left side view of the process cartridge, the locking mechanism of the image forming apparatus of FIG. 1, and a connecting and disconnecting mechanism, showing a state in which the yellow, magenta and cyan developing rollers are spaced apart from the photosensitive drums.
Figure 29:
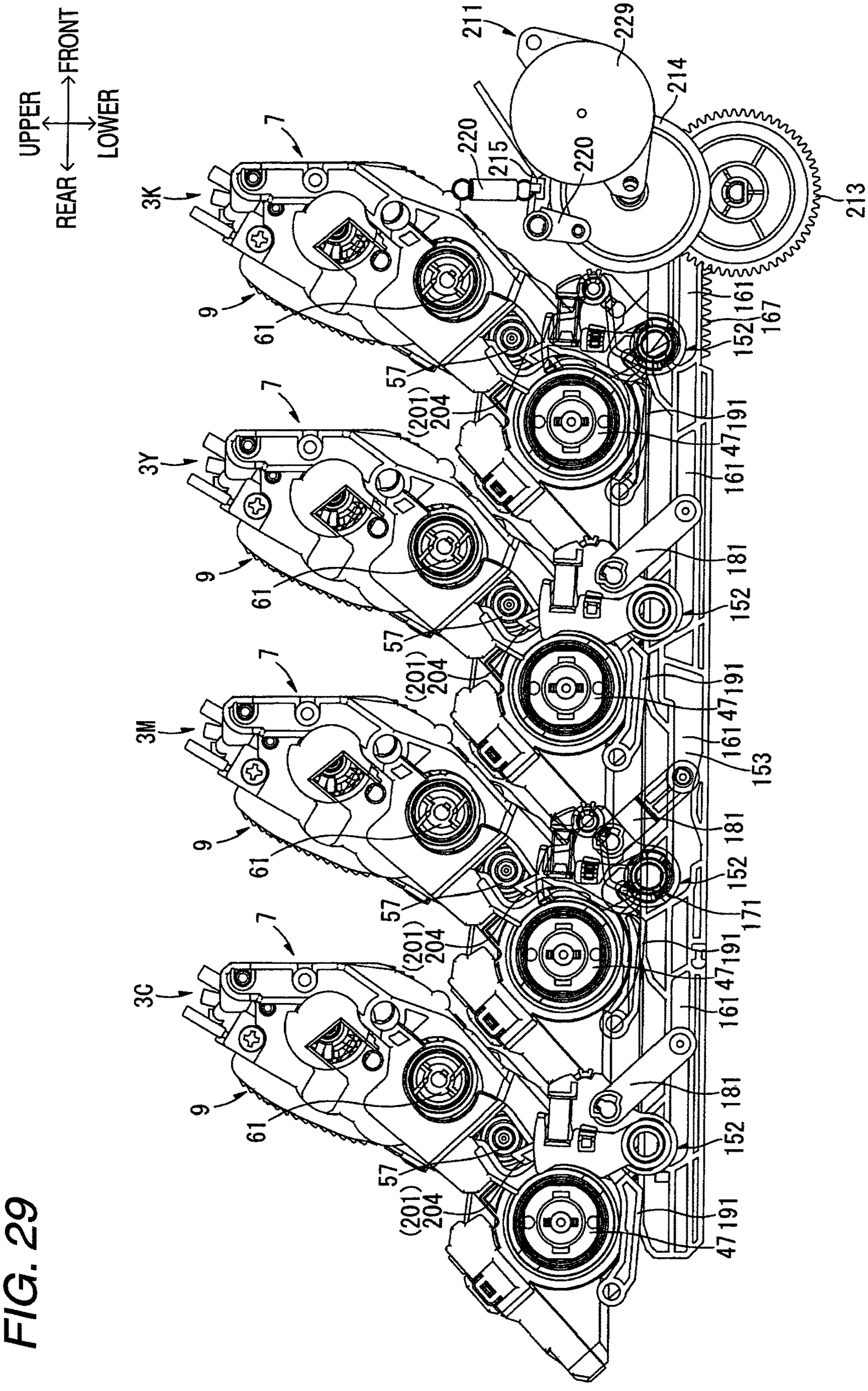
FIG. 29 is a left side view of the process cartridge, the locking mechanism, and the connecting and disconnecting mechanism of the image forming apparatus of FIG. 1, showing a state in which all the developing rollers are spaced apart from the photosensitive drums.

10. Connecting and Disconnecting Operations of Developing Rollers to and from Photosensitive Drums FIGS. 27 to 29 are left side views of the process cartridges, the locking mechanism and the connecting/disconnecting drive mechanism. FIG. 27 shows a state in which all the developing rollers are in contact with the photosensitive drums, FIG. 28 shows a state in which the yellow, magenta and cyan developing rollers are spaced apart from the photosensitive drums, and FIG. 29 shows a state in which all the developing rollers are spaced apart from the photosensitive rollers.

In such a state that the top cover 4 is closed, the connecting and disconnecting translation cam 153 can be caused to move by the driving force of the connecting and disconnecting motor 229 (refer to FIG. 27). By the top cover 4 being closed, the connecting and disconnecting translation cam 153 moves, and after the connecting shafts 183 of the left-hand link members 181 have reached the intersecting holes 77 (refer to FIG. 7) of the guide holes 75 of the body frame 62, even though the connecting and disconnecting translation cam 153 is caused to move rearwards further, the distal end portions of the connecting shafts 183 move within the linear groove portions 162 (refer to FIG. 24) of the guide grooves 161, and the postures of the link members 181 do not change. In addition, after the connecting shafts 186 of the right-hand link members 184 have reached the intersecting hole portions 82 (refer to FIG. 23) of the guide holes 80 on the body frame 63, even though the connecting and disconnecting translation cam 153 is caused to move rearwards further, the distal end portions of the connecting shafts 186 move within the linear groove portions 162 of the guide grooves 161, and the postures of the link members 184 do not change. Accordingly, in such a state that the top cover is closed, the state can be maintained in which the process cartridges 3 are fixed.

In a state after the top cover 4 has been closed, as is shown in FIG. 25, the spacing members 201 are in positions at which the lower projecting portions 203 are brought into abutment with the upper surface 350 (refer to FIG. 24) of the connecting and disconnecting translation cam 153 (but are not brought into abutment with the third cam portions 164) and the upper projecting portions 204 are lowered relatively downwards (permissive positions). Accordingly, as is shown in FIG. 27, the respective upper projections 204 of the spacing members 201 are spaced apart from the developing roller shaft bearing members 57, 58 which project both leftwards and rightwards from the developing cartridges 9, whereby a state results in which the developing rollers 8 (refer to FIG. 1) are in contact with the photosensitive drums 5 (refer to FIG. 1).

When the connecting and disconnecting translation cam 153 is caused to move rearwards from this state, the lower projecting portions 203 of the spacing members 201 which correspond to the yellow process cartridge 3Y, the magenta process cartridge 3M and the cyan process cartridge 3C move on the inclined surfaces 166 of the third cam portions 164 to move from the horizontal planes 165 to the inclined surfaces 166. Accordingly, the spacing members 201 are put in positions (spaced apart positions) where the lower projecting portions 203 are brought into abutment with the horizontal surfaces 165 while the upper projecting portions 204 are lifted upwards relatively, as is shown in FIG. 26. Accordingly, as is shown in FIG. 28, the pressing surfaces 205 of the upper projecting portions 204 press against the developing roller shaft bearing members 57, 58 of the yellow, magenta and cyan developing cartridges 9 from therebelow in such a state that the pressing surfaces extend along the up-down direction from the rear, whereby the yellow, magenta and cyan developing cartridges 9 are lifted upwards, and the developing rollers 8 which are equipped on the developing cartridges 9 are spaced apart from the photosensitive rollers 5. As this occurs, the developing roller 8 equipped on the black developing cartridge 9 is kept in contact with the mating photosensitive drum 5.

When the connecting and disconnecting translation cam 153 is caused to move rearwards further from this state, the lower projecting portion 203 of the spacing member 201 which corresponds to the black process cartridge 3K moves on the inclined surface 166 of the third cam portion 164 to move from the horizontal surface 165 on to the inclined surface 166, whereby the spacing member 201 is put in a position (a spaced apart position) in which the lower projecting portion 203 is brought into abutment with the horizontal surface 165 and the upper projecting portion 204 is lifted relatively upwards. As a result of this, as is shown in FIG. 29, the pressing surfaces 205 of the upper projecting portions 204 press against the developing roller shaft bearing members 57, 58 of the black developing cartridge 9 from therebelow in such a state that the pressing surfaces extend along the up-down direction from the rear, whereby the black developing cartridge 9 is lifted upwards, and eventually, the developing rollers 8 are spaced apart from the photosensitive rollers 5.

Although the developing cartridges 9 are caused to move vertically in such a state that the reciprocating members 112 are connected, respectively, to the developing roller drive gears 61, since the diameters in the front-rear direction of the elongated holes 36 into which the reciprocating members 112 are inserted are formed long, there occurs no situation in which the connection of the reciprocating members 112 with the developing roller drive gears 61 disturbs the vertical movement of the developing cartridges 9.

11. Advantage

The drum cartridge 7 includes the photosensitive drum 5, the connecting member 47 and the drum side engagement part 109. The drum drive transmission member 92 is brought into engagement with the connecting member 47, so that the driving force is transmitted from the drum drive transmission member 92 to the connecting member 47, whereby the photosensitive drum 5 rotates. The drum drive transmission member 92 can permit a positional gap of the connecting member 47 within a predetermined range, so as to transmit the driving force to the connecting member 47.

In addition, the developing cartridge 9 includes the developing roller 8 and the developing roller drive gear 61. The developing drive transmission member 93 is brought into engagement with the developing roller drive gear 61, so that the driving force is transmitted from the developing drive transmission member 93 to the developing roller drive gear 61, whereby the developing roller 8 rotates. The developing drive transmission member 93 can permit a positional gap of the developing roller drive gear 61 within a predetermined range, so as to transmit the driving force to the developing roller drive gear 61.

As a result, even though there is caused a positional gap of the connecting member 47 and the developing roller drive gear 61, the transmission of driving force can be attained from the drum drive transmission member 92 and the developing drive transmission member 93 to the connecting member 47 and the developing roller drive gear 61, respectively.

The drum drive transmission member 92 is provided in such a manner as to advance to and retreat from the connecting member 47. The drum drive transmission member 92 can advance to and retreat from or reciprocate relative to the connecting member 47 so as to be brought into engagement with and disengagement from the connecting member 47. In addition, the reciprocating member 112 of the developing drive transmission member 93 is provided in such a manner as to advance to and retreat from the developing roller drive gear 61. The reciprocating member 112 of the developing drive transmission member 93 can advance to and retreat from or reciprocate relative to the developing roller drive gear 61 so as to be brought into engagement with and disengaged from the developing roller drive gear 61.

In addition, the drum drive transmission member 93 and the reciprocating member 112 of the developing drive transmission member 93 can be reciprocated in a linked fashion by the driving translation cam 94.

Additionally, since the connecting member 47, the drum side engagement part 109 and the drum drive transmission member 92 make up the Oldham coupling, even though there is caused a small error in registration of the rotational center of the connecting member 47 with the rotational center of the drum drive transmission member 92, the driving force can be transmitted well from the drum drive transmission member 92 to the connecting member 47.

12. Other Embodiments

Figure 30A:
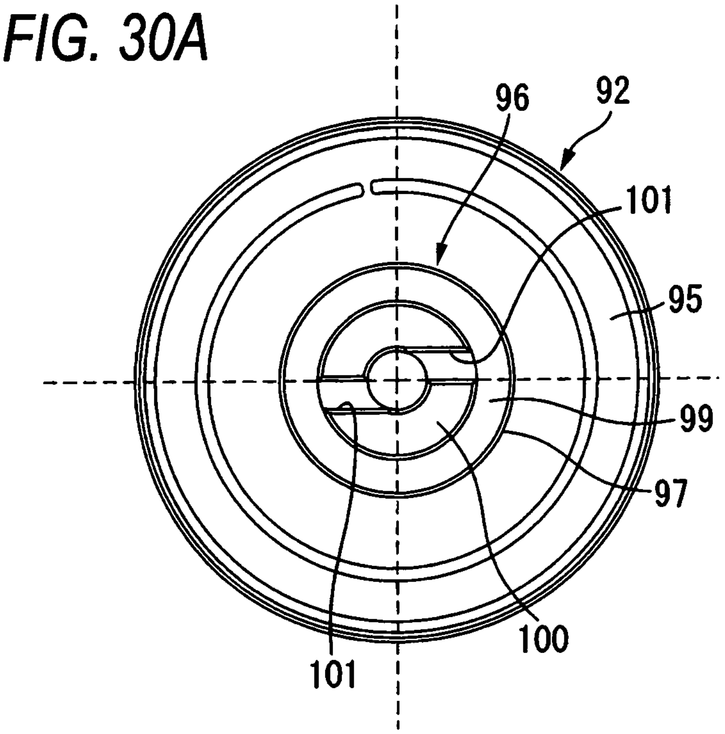
FIG. 30A is a right side view of a drum drive transmission member according to another embodiment of the invention.
Figure 30B:
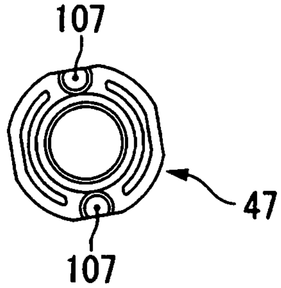
FIG. 30B is a left side view of a connecting member according to the another embodiment.
Figure 30C:
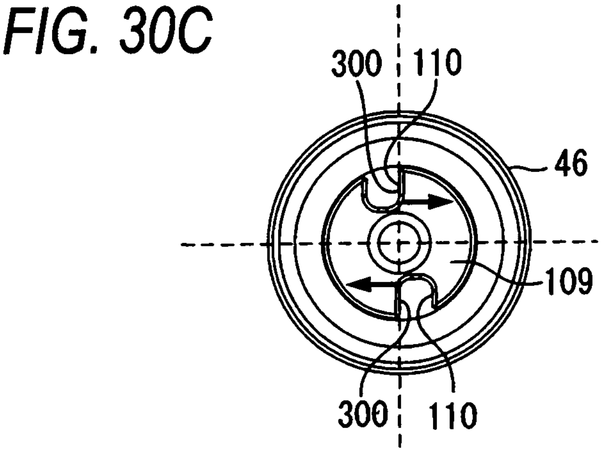
FIG. 30C is a left side view of a flange member according to the another embodiment.

FIG. 30A is a right side view of a drum drive transmission member according to another embodiment of the invention. FIG. 30B is a left side view of a coupling member according the other embodiment. FIG. 30C is a left side view of a flange member according to the additional embodiment.

As is shown in FIG. 30A, two engagement grooves 101 extend in a straight line, and side surfaces of the engagement grooves 101 which lie on a downstream side of a rotational direction of a drum drive transmission member 92 are formed, respectively, on straight lines which pass through a center of a distal end face 100 of the drum drive transmission member 92.

As is shown in FIG. 30B, a connecting member 47 has the same configuration as that shown in FIG. 17B.

As is shown in FIG. 30C, side surfaces 300 of two recessed portions 110 which lie on an upstream side of a rotational direction of a drum side engagement part 109 (a flange member 46) to function as drum drive force receiving surfaces are formed on straight lines which pass through the center of the distal end face 100 of the drum drive transmission member 92.

According to the configuration described above, the drum side engagement part 109 rotates by driving force being imparted from the drum drive transmission member 92 to the side surfaces 300 of the drum side engagement part 109 via the coupling member 47. Since the side surfaces 300 of the drum side engagement part 109 are disposed on a straight line which passes through a rotational center of the drum side engagement part 109, the driving force that is imparted from the drum drive transmission member 92 to the side surfaces 300 of the drum side engagement part 109 constitutes a force component exerted in a direction which follows the rotational direction of the drum side engagement part 109 (refer to arrows indicated by thick solid lines in FIG. 30C). Because of this, the drum side engagement part 109 can be caused to rotate in a stable fashion by virtue of the driving force from the drum drive transmission member 92. In contrast to this, with the flange member 46 shown in FIG. 17C, side surfaces 300 are not formed on the straight line which passes through the rotational center of the drum side engagement part 109, the driving force imparted from the drum drive transmission member 92 to the side surfaces 300 of the drum side engagement part 109 is exerted in a direction (refer to arrows indicated by thick solid lies in FIG. 17C) which is the different from the direction (refer to arrows indicated by thick broken lines in FIG. 17C) which follows the rotational direction of the drum side engagement part 109. Because of this, the rotational stability of the drum side engagement part 109 is deteriorated compared with that provided by the embodiment shown in FIG. 30C. This is also true with the developing roller drive gear 61 which will be described below.

Figure 31A:
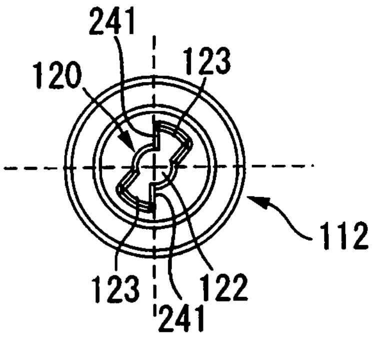
FIG. 31A is a right side view of a reciprocating member according to the other embodiment.

FIG. 31A is a right side view of a reciprocating member according to the additional embodiment.

As is shown in FIG. 31A, two abutment projecting portions 123 are formed to have substantially a fan shape as viewed from the side, end faces of the abutment projecting portions 123 so formed which lie at a downstream side of a rotational direction thereof are disposed on a straight line which passes through a center of a center portion 122.

Figure 31B:
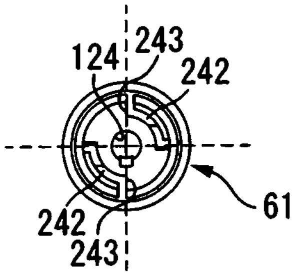
FIG. 31B is a left side view of a developing roller drive gear according to the other embodiment.

FIG. 31B is a left side view of a developing roller drive gear 61 according to the additional example.

Two abutment portions 242 are provided on a circumference of a recessed portion 124 on an external end face of a developing roller drive gear 61. Each abutment portion 242 has substantially a U-shape as viewed from the side, and an end face 243 of the abutment portion 242 so formed which lies at an upstream side of a rotational direction of the developing roller driver gear 61 to function as a developing driving force receiving surface is disposed on a straight line which passes through a rotational center of the developing roller drive gear 61.

According to the configuration described above, the respective end faces 241 of the abutment projecting portions 123 of the developing drive transmission member 93 are brought into abutment with the respective end faces 243 of the abutment portions 242 of the developing roller drive gear 61, so that driving force is imparted to the respective abutment portions 242 from the developing drive transmission member 93, whereby the developing roller drive gear 61 rotates. Since the respective end faces 241 of the abutment projecting portions 123 are disposed on the straight line which passes through the rotational center of the developing roller drive gear 61, the driving force imparted to the respective end faces 241 of the abutment projecting portions 123 from the developing drive transmission member 93 constitutes a force component exerted in a direction which follows the rotational direction of the developing roller drive gear 61. Because of this, the developing roller drive gear 61 can be caused to rotate in a stable fashion by virtue of the driving force from the developing drive transmission member 93.

While in the embodiment, the tandem type color printer 1 has been taken for description of the invention, the invention can also be applied to a multi-path intermediate belt transfer color printer in which toner images of respective colors are transferred on to an intermediate transfer belt from respective image carrier and thereafter the color images are transferred altogether on to a sheet from the intermediate transfer belt.

In addition, the invention can also be applied to a monochrome printer.

According to a first aspect of the invention, there is provided an image forming apparatus including a drum cartridge having a photosensitive drum and a drum drive input member into which driving force for rotating the photosensitive drum is inputted, a developing cartridge having a developing roller mounted movably relative to the drum cartridge and disposed in such a manner as to confront the photosensitive drum and a developing drive input member into which driving force for rotating the developing roller is inputted, a drum drive transmission member made to engage with the drum drive input member and adapted to permit a positional gap of the drum drive input member within a predetermined range to enable a transmission of driving force to the drum drive input member, and a developing drive transmission member made to engage with the developing drive input member and adapted to permit a positional gap of the developing drive input member within a predetermined range to enable a transmission of driving force to the developing drive input member.

According to a second aspect of the invention, there is provided an image forming apparatus as set forth in the first aspect of the invention, wherein the drum drive transmission member is provided in such a manner as not only to advance to a position where the drum drive transmission member advances to the drum drive input member so as to be brought into engagement with the drum drive input member but also to retreat to a position where the drum drive transmission member retreats from the drum drive input member so as to be disengaged from the drum drive input member, and wherein the developing drive transmission member is provided in such a manner as not only to advance to a position where the developing drive transmission member advances to the developing drive input member so as to be brought into engagement with the developing drive input member but also to retreat to a position where the developing drive transmission member retreats from the developing drive input member so as to be disengaged from the developing drive input member.

According to a third aspect of the invention, there is provided an image forming apparatus as set forth in the second aspect of the invention, including a linkage mechanism for causing the drum drive transmission member and the developing drive transmission member to advance or retreat in a linked fashion.

According to a fourth aspect of the invention, there is provided an image forming apparatus as set forth in any of the first to third aspects of the invention, wherein the drum drive input member and the drum drive transmission member constitute an Oldham coupling.

According to a fifth aspect of the invention, there is provided an image forming apparatus as set forth in any of the first to fourth aspects of the invention, wherein the drum drive input member is provided in such a manner as to rotate and has a drum driving force receiving surface with which the drum drive transmission member is made to be brought into abutment so as to receive driving force from the drum drive transmission member, and wherein the drum driving force receiving surface is disposed on a straight line which passes through a rotational center of the drum drive input member.

According to a sixth aspect of the invention, there is provided an image forming apparatus as set forth in any of the first to fifth aspects of the invention, wherein the developing drive input member is provided in such a manner as to rotate and has a developing driving force receiving surface with which the developing drive transmission member is made to be brought into abutment so as to receive driving force from the developing drive transmission member, and wherein the developing driving force receiving surface is disposed on a straight line which passes through a rotational center of the developing drive input member.

According to a seventh aspect of the invention, there is provided a process cartridge including a photosensitive drum, a process member for forming a developer image on a surface of the photosensitive drum, a drum drive input member into which driving force for rotating the photosensitive drum is inputted, and a process drive input member into which driving force for the process member is inputted, wherein a drum drive transmission member is brought into engagement with the drum drive input member so that driving force is transmitted thereto by the drum drive transmission member in such a state that a positional gap of the drum drive input member within a predetermined range is permitted by the drum drive transmission member, and wherein a process drive transmission member is brought into engagement with the process drive input member so that driving force is transmitted thereto by the process drive transmission member in such a state that a positional gap of the process drive input member within a predetermined range is permitted by the process drive transmission member.

According to an eighth aspect of the invention, there is provided a process cartridge as set forth in the seventh aspect of the invention, wherein the drum drive input member makes up an Oldham coupling together with the drum drive transmission member.

According to a ninth aspect of the invention, there is provided a process cartridge as set forth in the seventh or eighth aspect of the invention, wherein the drum drive input member is provided in such a manner as to rotate and has a drum driving force receiving surface with which the drum drive transmission member is made to be brought into abutment so as to receive driving force from the drum drive transmission member, and wherein the drum driving force receiving surface is disposed on a straight line which passes through a rotational center of the drum drive input member.

According to a tenth aspect of the invention, there is provided a process cartridge as set forth in any of the seventh to ninth aspects of the invention, wherein the process drive input member is provided in such a manner as to rotate and has a process driving force receiving surface with which the process drive transmission member is made to be brought into abutment so as to receive driving force from the process drive transmission member, and wherein the process driving force receiving surface is disposed on a straight line which passes through a rotational center of the process drive input member.

According to the first aspect of the invention, the drum cartridge includes the photosensitive drum and the drum drive input member. The drum drive transmission member is brought into engagement with the drum drive input member, so that the driving force is transmitted from the drum drive transmission member to the drum drive input member, whereby the photosensitive drum rotates. The drum drive transmission member permits the positional gap of the drum drive input member within the predetermined range, so as to transmit the driving force to the drum drive input member.

In addition, the developing cartridge includes the developing roller and the developing drive input member. The developing drive transmission member is brought into engagement with the developing drive input member, so that the driving force is transmitted from the developing drive transmission member to the developing drive input member, whereby the developing roller rotates. The developing drive transmission member permits the positional gap of the developing drive input member within the predetermined range, so as to transmit the driving force to the developing drive input member.

As a result, even though there is caused a positional gap of the drum drive input member and the developing drive input member, the transmission of driving force can be attained from the drum drive transmission member and the developing drive transmission member to the drum drive input member and the developing drive input member, respectively.

According to the second aspect of the invention, the drum drive transmission member is provided in such a manner as to advance to and retreat from the drum drive input member. The drum drive transmission member is provided in such a manner as to reciprocate so as to be engaged with and disengaged from the drum drive input member. In addition, the developing drive transmission member is provided in such a manner as to advance to and retreat from the developing drive input member. The developing drive transmission member is provided in such a manner as to reciprocate so as to be engaged with and disengaged from the developing drive input member.

According to the third aspect of the invention, the drum drive transmission member and the developing drive transmission member can be caused to advance and retreat in a linked fashion by the linkage mechanism.

According to the fourth aspect of the invention, since the drum drive input member and the drum drive transmission member make up the Oldham coupling, even though there is caused a small error in registration of the rotational center of the drum drive input member with the rotational center of the drum drive transmission member, the driving force can be transmitted well from the drum drive transmission member to the drum drive input member.

According to the fifth aspect of the invention, the drum drive transmission member is brought into abutment with the drum driving force receiving surface of the drum drive input member, so that the driving force is imparted from the drum drive transmission member to the drum driving force receiving surface, whereby the drum drive input member rotates. Since the drum driving force receiving surface is disposed on the straight line which passes through the rotational center of the developing drive input member, the driving force imparted from the drum drive transmission member to the drum driving force receiving surface constitutes a force component which follows a rotational direction of the drum drive input member. Because of this, the drum drive input member can be caused to rotate in a stable fashion by virtue of the driving force from the drum drive transmission member.

According to the sixth aspect of the invention, the developing drive transmission member is brought into abutment with the developing driving force receiving surface of the developing drive input member, so that the driving force is imparted from the developing drive transmission member to the developing driving force receiving surface, whereby the developing drive input member rotates. Since the developing driving force receiving surface is disposed on the straight line which passes through the rotational center of the developing drive input member, the driving force imparted from the developing drive transmission member to the developing driving force receiving surface constitutes a force component which follows a rotational direction of the developing drive input member. Because of this, the developing drive input member can be caused to rotate in a stable fashion by virtue of the driving force from the developing drive transmission member.

According to the seventh aspect of the invention, the process cartridge includes the photosensitive drum and the drum drive input member. By the drum drive transmission member being brought into engagement with the drum drive input member so that the driving force is transmitted from the drum drive transmission member to the drum drive input member, the photosensitive drum rotates. The drum drive transmission member can permit the positional gap of the drum drive input member within the predetermined range, so as to transmit the driving force to the drum drive input member.

In addition, the process cartridge includes the process member and the process drive input member. By the process drive transmission member being brought into engagement with the process drive input member so that the driving force is transmitted from the process drive transmission member to the process drive input member, the process member is driven. The process drive transmission member can permit the positional gap of the process drive input member within the predetermined range, so as to transmit the driving force to the process drive input member.

As a result, even though there is caused a positional gap of the drum drive input member and the process drive input member, the driving force can be inputted into the drum drive input member and the process drive input member.

According to the eighth aspect of the invention, since the drum drive input member and the drum drive transmission member constitute the Oldham coupling, even though there is caused a small error in registration of the rotational center of the drum drive input member with the rotational center of the drum drive transmission member, the driving force can be transmitted well from the drum drive transmission member to the drum drive input member.

According to the ninth aspect of the invention, the drum drive transmission member is brought into abutment with the drum driving force receiving surface of the drum drive input member, so that the driving force is imparted from the drum drive transmission member to the drum driving force receiving surface, whereby the drum drive input member rotates. Since the drum driving force receiving surface is disposed on the straight line which passes through the rotational center of the developing drive input member, the driving force imparted from the drum drive transmission member to the drum driving force receiving surface constitutes a force component which follows a rotational direction of the drum drive input member. Because of this, the drum drive input member can be caused to rotate in a stable fashion by virtue of the driving force from the drum drive transmission member.

According to the tenth aspect of the invention, the process drive transmission member is brought into abutment with the process driving force receiving surface of the process drive input member, so that the driving force is imparted from the process drive transmission member to the process driving force receiving surface, whereby the process drive input member rotates. Since the process driving force receiving surface is disposed on the straight line which passes through the rotational center of the process drive input member, the driving force imparted from the process drive transmission member to the process driving force receiving surface constitutes a force component which follows a rotational direction of the process drive input member. Because of this, the process drive input member can be caused to rotate in a stable fashion by virtue of the driving force from the process drive transmission member.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A process cartridge comprising:

a frame including:

a photosensitive drum rotatable about a first axis extending in a first direction;

a flange fixed to the photosensitive drum; and a drum coupling configured to rotate the photosensitive drum; and a housing configured to accommodate toner therein, the housing including:

a developing roller including a developing roller shaft; and a developing roller bearing, wherein the developing roller shaft is inserted in the developing roller bearing, wherein the housing is movable relative to the frame between a first position and a second position, wherein a first distance between a surface of the developing roller and a surface of the photosensitive drum in a case where the housing is at the first position is less than a second distance between the surface of the developing roller and the surface of the photosensitive drum in a case where the housing is at the second position, wherein the flange and the drum coupling are aligned in the first direction, and wherein at least a portion of the drum coupling is movable relative to the flange.

2. The process cartridge according to claim 1 further having a groove, wherein the developing roller bearing is fitted in the groove.

3. The process cartridge according to claim 2, wherein the frame has the groove.

4. The process cartridge according to claim 1, wherein the frame has a first end and a second end separated from the first end in the first direction, wherein the drum coupling is positioned at the first end of the frame, and wherein the developing roller bearing is closer to the first end of the frame than the second end of the frame in the first direction.

5. The process cartridge according to claim 1, wherein the drum coupling is movable relative to the flange.

6. The process cartridge according to claim 1, wherein the surface of the developing roller is in contact with the surface of the photosensitive drum in a case where the housing is at the first position, and wherein the surface of the developing roller is spaced apart from the surface of the photosensitive drum in a case where the housing is at the second position.

7. The process cartridge according to claim 1, wherein the drum coupling is an Oldham coupling.

8. The process cartridge according to claim 7, wherein the drum coupling is attached to an end face of the flange.

9. The process cartridge according to claim 8, wherein the flange has a second groove formed on the end face of the flange, and wherein the drum coupling has a projection fitted in the second groove.

10. The process cartridge according to claim 1, wherein the housing further includes a developing coupling configured to rotate the developing roller.

* * * * *